United States Patent
Song et al.

(10) Patent No.: US 12,134,409 B1
(45) Date of Patent: Nov. 5, 2024

(54) METHODS FOR COOPERATIVE DECISION-MAKING ON LANE-CHANGING BEHAVIORS OF AUTONOMOUS VEHICLES BASED ON BAYESIAN GAME

(71) Applicant: TIANJIN UNIVERSITY, Tianjin (CN)

(72) Inventors: Kang Song, Tianjin (CN); Fan Guo, Tianjin (CN); Hui Xie, Tianjin (CN)

(73) Assignee: TIANJIN UNIVERSITY, Tianjin (CN)

( * ) Notice: Subject to any disclaimer, the term of this patent is extended or adjusted under 35 U.S.C. 154(b) by 0 days.

(21) Appl. No.: 18/752,907

(22) Filed: Jun. 25, 2024

Related U.S. Application Data

(63) Continuation-in-part of application No. PCT/CN2023/086547, filed on Apr. 6, 2023.

(30) Foreign Application Priority Data

May 30, 2022 (CN) .......................... 202210603381.7

(51) Int. Cl.
*B60W 60/00* (2020.01)
*B60W 50/00* (2006.01)

(52) U.S. Cl.
CPC .... *B60W 60/0027* (2020.02); *B60W 50/0097* (2013.01); *B60W 60/001* (2020.02);
(Continued)

(58) Field of Classification Search
None
See application file for complete search history.

(56) References Cited

U.S. PATENT DOCUMENTS

2014/0195093 A1 7/2014 Litkouhi et al.
2020/0172093 A1 6/2020 Kum et al.
(Continued)

FOREIGN PATENT DOCUMENTS

CN 104391504 A 3/2015
CN 108595823 A 9/2018
(Continued)

OTHER PUBLICATIONS

Decision to Grant a Patent in Chinese Application No. 202210603381.7 mailed on Jan. 29, 2024, 6 pages.
(Continued)

*Primary Examiner* — David P. Merlino
(74) *Attorney, Agent, or Firm* — METIS IP LLC

(57) ABSTRACT

Disclosed is a method for cooperative decision-making on lane-changing behavior of an autonomous vehicle based on Bayesian game. On one hand, intelligent networked road perception and big data analysis are utilized to infer statistical characteristics of driving styles of a side vehicle under different time periods and traffic flow states, serving as prior predictions of driving styles of the side vehicle. On the other hand, the dynamic interaction behaviors during lane-changing processes of a specified vehicle and the side vehicle are continuously observed and posterior corrections are made to the driving styles of the side vehicle. When the specified vehicle generates a lane-changing willingness, probabilities of driving styles are iteratively predicted using Bayesian game principles. Comprehensive consideration of style and willingness probabilities yields a lane-changing probability of the specified vehicle. Once the lane-changing probability exceeds a threshold, a lane-changing activation instruction is issued.

8 Claims, 11 Drawing Sheets

(52) U.S. Cl.
CPC ............... *B60W 2050/0031* (2013.01); *B60W 2050/0052* (2013.01); *B60W 2552/10* (2020.02); *B60W 2554/4041* (2020.02); *B60W 2554/4046* (2020.02); *B60W 2720/106* (2013.01)

(56) References Cited

U.S. PATENT DOCUMENTS

| | | |
|---|---|---|
| 2021/0188317 A1 | 6/2021 | Xia et al. |
| 2022/0073098 A1 | 3/2022 | D'Orazio et al. |

FOREIGN PATENT DOCUMENTS

| | | | |
|---|---|---|---|
| CN | 110471408 A | | 11/2019 |
| CN | 111081065 A | | 4/2020 |
| CN | 112509377 A | | 3/2021 |
| CN | 113095558 A | | 7/2021 |
| CN | 113401143 A | * | 9/2021 |
| CN | 114493191 A | | 5/2022 |
| CN | 115056798 A | | 9/2022 |
| WO | 2014206654 A1 | | 12/2014 |
| WO | 2021017132 A1 | | 2/2021 |

OTHER PUBLICATIONS

Jami Pekkanen et al., A Computational Model for Driver's Cognitive State, Visual Perception and Intermittent Attention in a Distracted Car Following Task, R. Soc. Open Sci, 5, 2018, 23 pages.
Zhang, Qingyu et al., A Game Theoretic Model Predictive Controller with Aggressiveness Estimation for Mandatory Lane Change, IEEE Transactions On Intelligent Vehicles, 100, 2019, 16 pages.
Yang, Yan et al., Markov Decision-Based Pilot Optimization for 5G V2X Vehicular Communications, IEEE Internet of Things Journal, 2018, 15 pages.
Laurens Hobert et al., Enhancements of V2X Communication in Support of Cooperative Autonomous Driving, IEEE Communications Magazine: 64-70, 2015.
Andrew Bacha et al., Odin: Team VictorTango's Entry in the DARPA Urban Challenge, Journal of Field Robotics, 25(8): 467-492, 2008.
Mariusz Bojarski et al., End to End Learning for Self-Driving Cars, arXiv.org, 2016, 9 pages.
International Search Report in PCT/CN2023/086547 mailed on Jul. 5, 2023, 6 pages.
Written Opinion in PCT/CN2023/086547 mailed on Jul. 5, 2023, 6 pages.

* cited by examiner

900

METHODS FOR COOPERATIVE DECISION-MAKING ON LANE-CHANGING BEHAVIORS OF AUTONOMOUS VEHICLES BASED ON BAYESIAN GAME

CROSS-REFERENCE TO RELATED APPLICATIONS

This application is a continuation-in-part of International Patent Application No. PCT/CN2023/086547, filed on Apr. 6, 2023, which claims priority to Chinese Patent Application No. 202210603381.7, filed on May 30, 2022, the entire contents of each of which are incorporated herein by reference.

TECHNICAL FIELD

The present disclosure relates to the field of autonomous driving behavior decision-making, and in particular, to a method for cooperative decision-making on lane-changing behavior of an autonomous vehicle based on Bayesian game.

BACKGROUND

An autonomous vehicle is a highly intelligent system that integrates environmental state perception, behavior decision-making, and planning control. With the rapid development of autonomous driving technology, mixed traffic scenarios involving both autonomous and human-driven vehicles will soon emerge and gradually become common. Typical scenarios frequently encountered by an autonomous vehicle may include entering and exiting ramps, lane merging, forced lane changes due to road construction and obstacle avoidance, etc. Statistics show that over 35% of traffic accidents during manual driving are caused by lane changes, and approximately 75% of these accidents result from misjudgments in lane-changing decisions by drivers. Thus, an ability of the autonomous vehicles to make scientifically sound and reasonable lane-changing decisions is crucial to a decision-making algorithm of the autonomous vehicle and serves as an important foundation for subsequent planning and control algorithms.

Although traffic regulations clearly define norms and requirements for vehicle road travel, the decision-making algorithm for lane changes in real-world driving conditions still faces considerable challenges for several reasons: 1) Lane changes are completed through continuous interactions between a specified vehicle and a side vehicle, involving complex coupling effects and game processes closely related to driving styles and intentions; 2) The driving style of side vehicle is difficult to accurately judge, making it hard to predict whether the side vehicle will cooperate with or resist the lane-changing behavior of the specified vehicle; 3) Even if the driving styles are relatively clear, the specific driving intentions during each lane change may be influenced by emotions, sudden interferences, and other uncertain factors.

Therefore, lane-change decision-making is a complex optimization problem under conditions of significant uncertainty and multi-agent interaction. It is one of the key challenges for developing an effective decision-making algorithm for autonomous vehicles in such mixed scenarios to achieve efficient, safe, and comfortable lane-changing behavior in autonomous driving technology.

To address the aforementioned challenges, some researchers have proposed methods based on inter-vehicle cooperation and vehicle-to-infrastructure (V2I) cooperation. These methods utilize communication between vehicles and between vehicles and road infrastructure to resolve traffic conflicts. For example, CN 202011368453.1 discloses a vehicle-to-vehicle (V2V) based cooperative lane-changing control method. The literature (Yang Y, Dang S, He Y, et al. Markov decision-based pilot optimization for 5G V2X vehicular communications [J], IEEE Internet of Things Journal, 2018, 6 (1): 1090-1103) discusses using 5G and V2X technologies to assist autonomous vehicle decision-making. Similarly, the literature (Hobert L, Festag A, Llatser I, et al. Enhancements of V2X communication in support of cooperative autonomous driving [J], IEEE Communications Magazine, 2015, 53 (12): 64-70) discusses using V2X communication to support cooperative autonomous driving. Although these strategies can improve traffic safety and efficiency, they overly rely on inter-vehicle communication devices and roadside infrastructure, making widespread implementation challenging in the short term.

Additionally, a significant amount of research focuses on decision-making algorithms for individual vehicle intelligence, such as a state machine model, an inference decision model, a game theory-based decision method, or the like.

The state machine model mainly includes a Finite State Machine (FSM) model and a Hierarchical State Machine (HSM) model. Due to its simple structure and clear logic, the state machine model is widely adopted by autonomous vehicles. For example, the 2005 DARPA Urban Challenge winner, Junior, utilized such models in the literature (Bacha A, Bauman C, Faruque R, et al. Odin: Team VictorTango's entry in the DARPA Urban Challenge [J], Journal of Field Robotics, 2008, 25 (8): 467-492). However, the state machine model does not consider the complex coupling and game processes of interactions between the specified vehicle and side vehicle during lane changes, making it less suitable for a lane-changing decision task in a structured road environment.

The inference decision model simulates a human driver's decision-making process by mapping "scenario features" to "driving actions." The inference decision model stores driving knowledge in a knowledge base or neural network and infer driving actions by querying the knowledge base or trained neural network. For example, the literature (Bojarski M, Del Testa D, Dworakowski D, et al. End to end learning for self-driving cars, arXiv preprint arXiv: 1604.07316, 2016) utilized a method that learns a mapping relationship from perceived image features to specific driving behavior control. However, the method also has limited consideration of interactive effects in the lane-changing decision process, primarily relying on a fixed paradigm of training data and not accounting for uncertainties in the driving style and intentions of the side vehicle.

The above analysis indicates that considering multi-vehicle interactions is a significant breakthrough to enhance the decision-making level of autonomous vehicles. Consequently, game theory has gained increasing attention in modeling vehicle interaction characteristics. Non-cooperative games are the commonly adopted type of vehicle interaction behavior in the industry, with optimal behavior determined by Nash equilibrium conditions. For example, the literature (Pekkanen, J., Lappi, O., Rinkkala, P., Tuhkanen, S., Frantsi, R., Summala, H., 2018. A computational model for driver's cognitive state, visual perception, and intermittent attention in a distracted car-following task, R. Soc. Open Sci. 5 (9), 180194, 2018) applied game theory methods to car-following strategies. Similarly, the literature (Q. Zhang, R. Langari, H. E. Tseng, D. Filev, S. Szwabowski, and S. Coskun, A Game Theoretic Model Predictive Controller With Aggressiveness Estimation for Mandatory Lane Change, IEEE Transactions on Intelligent Vehicles, vol. 5, no. 1, pp. 75-89, March 2020) applied game theory-based model predictive control to vehicle decision-making. However, the above gaming processes rarely consider the uncertainties in each player's (e.g., vehicle's) driving styles, risk preferences, and environmental sensitivity, resulting in hypothetical and singular driver behavior payoff models that do not align with reality, thus limiting the decision-making capability of vehicles in complex scenarios.

In summary, accurately estimating the driving style and intentions of side vehicles during lane changes is crucial for the safety, efficiency, and comfort of lane-changing behaviors. However, existing methods do not provide a decision-making algorithm that specifically addresses these considerations. Therefore, it is of significance to develop a scientifically sound decision-making algorithm that considers dynamic multi-vehicle interactions under conditions of mixed traffic and uncertain driving styles, leveraging advanced perception and data processing technologies, thereby greatly enhancing the decision-making quality of autonomous vehicles. Currently, there is little published information addressing this issue.

SUMMARY

To address the issues in existing technologies related to the difficulty, risk, and inefficiency of lane-changing decisions for autonomous vehicles due to the uncertain driving styles of side vehicles, the present disclosure provides a method for cooperative decision-making on lane-changing behavior of an autonomous vehicle based on Bayesian game.

The technical solution adopted to achieve the objectives of the present disclosure may include follow operations.

step 1, establishing a prior probability distribution of a vehicle driving style of a side vehicle, including: obtaining vehicle driving data through an intelligent networked roadside sensor, and recording and counting the prior probability distribution of the vehicle driving style under different time periods and different road sections, wherein the vehicle driving style of the side vehicle includes an aggressive driving style and a non-aggressive driving style; step 2, outputting a lane-changing willingness through a lane-changing willingness determination module, including: collecting vehicle information of a specified vehicle (SV) and a surrounding vehicle through an on-board sensor, determining an original predetermined distance and a lane-changing predetermined distance, determining a lane-changing necessity and a lane-changing safety through a cumulative distribution function constructed by introducing an expectation and a variance, establishing a lane-changing willingness output model based on fuzzy logic, and executing following steps 3-7 in response to the lane-changing willingness reaching a lane-changing willingness threshold; step 3, inferring a posterior probability of a vehicle driving style of a rear vehicle (RV) in a target lane using Bayesian filtering, including: in response to the lane-changing willingness of the specified vehicle reaching the lane-changing willingness threshold, determining a likelihood function of the vehicle driving style of the rear vehicle in the target lane based on an acceleration of the rear vehicle in the target lane acquired by the on-board sensor, and obtaining, through the likelihood function and the prior probability distribution, the posterior probability of the vehicle driving style of the rear vehicle in the target lane and a driver aggressiveness factor $\beta$ of the rear vehicle in the target lane, the driver aggressiveness factor having a value in a range of [0, 1]; step 4, predicting, through a Long Short-Term Memory (LSTM) neural network and a vehicle kinematic model, driving trajectories, driving speeds, and accelerations of the specified vehicle and the rear vehicle in the target lane in a future-projected time domain; step 5, establishing payoff matrices and determining a probability of lane-changing execution, including: establishing payoff matrices for a non-cooperative game, wherein the payoff matrices for the non-cooperative game include a payoff matrix of the specified vehicle and an aggressive rear vehicle in the target lane, and a payoff matrix of the specified vehicle and a non-aggressive rear vehicle in the target lane, respectively, and payoff functions of the payoff matrices include a function of a safety prediction payoff, a function of a time prediction payoff, a function of a comfort prediction payoff, and a function of a cooperation prediction payoff, and obtaining the probability of lane-changing execution by solving the payoff matrix; step 6, updating a vehicle state, including: in response to a determination that the probability of lane-changing execution is less than an execution threshold, the specified vehicle not executing a lane-changing, updating a longitudinal trajectory of the specified vehicle; and in response to a determination that the probability of lane-changing execution is greater than or equal to the execution threshold, updating a lane-changing trajectory and the longitudinal trajectory of the specified vehicle, simultaneously; and step 7, cyclically executing dynamic game-based lane-changing decision-making, including: cyclically executing steps 3-6 until an execution of a lane-changing strategy is completed or the lane-changing willingness disappears.

In the above technical solution, in the step 1, a count of aggressive drivers n (A) and a count of non-aggressive drivers n(NA) are determined under a set road section and a set time period using a clustering algorithm to solve for the prior probability distribution of vehicle driving style of the side vehicle:

$$\begin{cases} P_0(X|(\text{road, time})) = [p(A), 1 - p(A)] \\ p(A) = \dfrac{n(A)}{n(A) + n(NA)} \end{cases}$$

wherein, road and time denote the set road section and the set time period, respectively, p(A) denotes a probability that the vehicle driving style is aggressive, and 1−p(A) denotes a probability that the vehicle driving style is non-aggressive.

In the above technical solution, in the step 2, an original predetermined distance $d_{min}$ and a lane-changing predetermined distance $l_{min}$ are determined, wherein $d_{min}$ is a minimum of all original predetermined distances $[d_1, d_2, \ldots, d_t]$ in the next t moments, $l_{min}$ is a minimum of all lane-changing predetermined distances $[l_1, l_2, \ldots, l_t]$ in the next t moments, and the lane-changing necessity and the lane-changing safety are determined based on the cumulative distribution function constructed by introducing the expectation and the variance:

$$P_{ne} = \frac{1}{\sigma\sqrt{2\pi}} \int e^{-\frac{(d_{min}-u_k)^2}{2\sigma^2}} dd_{min}$$

$$P_{sf} = \frac{1}{\sigma\sqrt{2\pi}} \int e^{-\frac{(l_{min}-u_l)^2}{2\sigma^2}} dl_{min}$$

wherein, $P_{ne}$ and $P_{sf}$ denote the lane-changing necessity and the lane-changing safety, respectively, $u_k$ and $u_l$ denote an expectation of the original predetermined distance and an expectation of the lane-changing predetermined distance, respectively, and $\sigma$ denotes the variance. In the lane-changing willingness output model, a membership function of each of the lane-changing necessity, the lane-changing safety, and the lane-changing willingness is constructed, and a lane-changing willingness $\varphi_{LC}$ is obtained by performing a defuzzification operation according to a fuzzy rule table and a center of mass technique. In response to a determination that the lane-changing willingness PLC is greater than the lane-changing willingness threshold $\varphi_{dier}$, subsequent lane-changing decision-making process is performed.

In the above technical solution, in the step 3, an accuracy y of the acceleration of the rear vehicle in the target lane is determined based on the on-board sensor, a likelihood function of a driving state of the rear vehicle in the target lane being a non-decelerating state is determined, denoted as $L(\theta|A)=(y, 1-y)$, and a likelihood function of the driving state of the rear vehicle in the target lane being a decelerating state is determined, denoted as $L(\theta|NA)=(1-y, y)$.

The posterior probability distribution $P_t(Y|(road,time))$ of the vehicle driving style of the rear vehicle in the target lane is obtained based on the prior probability distribution of the vehicle driving style and the likelihood function:

$$P_t(Y|(road,time)) = normalize(P_0(X|(road,time)*L(\theta))$$

A posterior probability distribution at a moment t is designated as a prior probability distribution at a moment t+1.

The driver aggressiveness factor $\beta_t$ of the rear vehicle in the target lane at the moment t is obtained based on the posteriori probability distribution of the vehicle driving style:

$$\beta_t = V_{type} \cdot P_t(Y|(road,time))$$

wherein $V_{type}$ denotes a unit vector.

In the above technical solution, in the step 4, the driving speed of the specified vehicle, the acceleration of the specified vehicle, the driving speed of the rear vehicle in the target lane, and the acceleration of the rear vehicle in the target lane are obtained through prediction based on the LSTM neural network, a driving trajectory of the specified vehicle and a driving trajectory of a non-lane-changing behavior of the rear vehicle in the target lane in the future-projected time domain are obtained through prediction based on the vehicle kinematic model, and a driving trajectory of a lane-changing behavior of the specified vehicle is obtained based on the longitudinal trajectory deduced from the vehicle kinematic model and a lateral trajectory deduced from a fifth degree polynomial curve.

In the above technical solution, in the step 5, the payoff matrix of the specified vehicle and the aggressive rear vehicle in the target lane is: $(U_{11},Q_{11})$, $(U_{12},Q_{12})$, $(U_{21},Q_{21})$, and $(U_{22},Q_{22})$, wherein $U_{11}$, $U_{12}$, $U_{21}$, $U_{22}$ denote payoffs of the specified vehicle under a combination of four strategies with the aggressive rear vehicle in the target lane, which includes a strategy of [lane-changing, deceleration], a strategy of [lane-changing, acceleration], a strategy of [no lane-changing, deceleration], and a strategy of [no lane-changing, acceleration], respectively;

$Q_{11}$, $Q_{12}$, $Q_{21}$, $Q_{22}$ denote payoffs of the aggressive rear vehicle in the target lane under a combination of four strategies with the specified vehicle, which includes a strategy of [lane-changing, deceleration], a strategy of [lane-changing, acceleration], a strategy of [no lane-changing, deceleration], and a strategy of [no lane-changing, acceleration], respectively.

The payoff matrix of the specified vehicle and the non-aggressive rear vehicle in the target lane is: $(U_{33},Q_{33})$, $(U_{34},Q_{34})$, $(U_{43},Q_{43})$, and $(U_{44},Q_{44})$, wherein $U_{33}$, $U_{34}$, $U_{43}$, $U_{44}$ denote payoffs of the specified vehicle under a combination of four strategies with the non-aggressive rear vehicle in the target lane, which includes a strategy of [lane-changing, deceleration], a strategy of [lane-changing, acceleration], a strategy of [no lane-changing, deceleration], and a strategy of [no lane-changing, acceleration], respectively;

$Q_{33}$, $Q_{34}$, $Q_{43}$, $Q_{44}$ denote payoffs of the non-aggressive rear vehicle in the target lane under a combination of four strategies with the specified vehicle, which includes a strategy of [lane-changing, deceleration], a strategy of [lane-changing, acceleration], a strategy of [no lane-changing, deceleration], and a strategy of [no lane-changing, acceleration], respectively.

The payoff U for the specified vehicle and the payoff Q for the rear vehicle in the target lane include payoffs at a future moment, the payoffs at the future moment including four components:

(1) The safety prediction payoff, denotes as:

$$Term(sf) = -\{\omega_{11}[A_c(t') + v_{SV}(t') * v_{RV}(t')] * I(A_c) + \omega_{12}[A_s(t') + v_{SV}(t') * v_{RV}(t')] * I(A_s)\}$$

wherein, $v_{SV}(t')$ and $v_{RV}(t')$ denote a driving speed of the specified vehicle and a driving speed of the rear vehicle in the target lane at a predicted moment t', respectively, $A_c(t')$ denotes an overlap area of vehicle collision determination regions at the predicted moment t', $A_s(t')$ denotes an overlap area of vehicle safety reservation regions at the predicted moment t', $\omega_{11}$ and $\omega_{12}$ denote a collision weight and a safety reservation weight, respectively, and $I(A_c)$ and $I(A_s)$ denote indicator functions, $I(A_c)$ takes a value of 1 when the vehicle collision determination regions overlap and takes a value of 0 when the vehicle collision determination regions do not overlap, $I(A_s)$ takes a value of 1 when the vehicle safety reservation regions overlap an takes a value of 0 when the vehicle safety reservation regions do not overlap.

(2) The time prediction payoff, denoted as:

$$Term(time) = v(t')$$

wherein, $v(t')$ denotes a driving speed of the rear vehicle in the target lane in the game at the predicted moment t';

(3) The comfort prediction payoff:

Taking a derivative, denoted as Jerk, of an acceleration of the specified vehicle or an acceleration of the rear vehicle in the target lane at the predicted moment t' during a vehicle driving process as the comfort prediction payoff, denoted as:

$$Term(cf) = -|Jerk(t')|$$

wherein, Jerk(t') denotes the derivative of the acceleration of the specified vehicle or the acceleration of the rear vehicle in the target lane at the predicted moment t'.

(4) The cooperation prediction payoff:

Taking an acceleration $a_j$(t') of the rear vehicle in the target lane in the game at the predicted moment t' as a quantitative index of the cooperation prediction payoff, denoted as:

Term($gt$)=−|$a_j$(t')| wherein the payoff of the specified vehicle and the payoff of the rear vehicle in the target lane are determined by combining and weighting, respectively:

$$U = \sum_{t+1}^{H} (\omega_1 \text{Term}(sf) + \omega_2 \text{Term}(\text{time}) + \omega_3 \text{Term}(cf) + \omega_4 \text{Term}(gt))$$

$$Q = \sum_{t+1}^{H} (\sigma_1 \text{Term}(sf) + \sigma_2 \text{Term}(\text{time}) + \sigma_3 \text{Term}(cf) + \sigma_4 \text{Term}(gt))$$

wherein, $\omega=[\omega_1, \omega_2, \omega_3, \omega_4]$ and $\sigma=[\sigma_1, \sigma_2, \sigma_3, \theta_4]$, $\omega$ and $\sigma$ denote weight coefficients, wherein the driver aggressiveness factor $\beta_t$ is used to construct the weight coefficients of the payoff U of the specified vehicle:

$$\omega = \begin{cases} \omega_1 = k_1 * \beta_t \\ \omega_2 = k_2 * (1 - \beta_t) \\ \omega_3 = k_3 * (1 - \beta_t) \\ \omega_4 = k_4 * \beta_t \end{cases}$$

wherein $k=[k_1, k_2, k_3, k_4]$, $k_1$, $k_2$, $k_3$, and $k_4$ denote a gain factor for the safety prediction payoff, the time prediction payoff, the comfort prediction payoff, and the cooperation prediction payoff, respectively.

In the above technical solution, the probability of lane-changing execution of the specified vehicle is determined based on eight cases of the payoff matrix, the eight cases of the payoff matrix including the payoff matrix of the specified vehicle and the aggressive rear vehicle in the target lane, and the payoff matrix of the specified vehicle and the non-aggressive rear vehicle in the target lane, and an expected payoff Ep is denoted as:

$E_p=P_t(Y|\text{road,time})*[P_t(l_c)*(U_{11}+U_{12})+(1−P_t(l_c))*$
$(U_{21}+U_{22})]+(1−P_t(Y|\text{road,time})))*[P_t(l_c)*(U_{33}+$
$U_{34})+(1−P_t(l_c))*(U_{43}+U_{44})]$ The probability of lane change execution $P_t*(l_c)$ is determined when the expected payoff $E_p$ is maximized.

In the above technical solution, in the step 6, in response to a determination that the probability of lane-changing execution is less than the execution threshold, the longitudinal trajectory of the specified vehicle is updated, and the longitudinal trajectory is determined based on a full velocity difference (FVD) model:

$a_j(t)=\rho[V(\Delta(x_j))−v_j(t)]+\lambda \Delta v_j(t)$ wherein j denotes a vehicle number, $a_j$(t) denotes an acceleration at a moment t, $v_j$(t) denotes a driving speed at the moment t, $\Delta v_j$(t) denotes a speed difference at the moment t, $\rho$ and $\lambda$ denote weight coefficients, and $V(\Delta(x_j))$ denotes an optimized speed function:

$$V(\Delta(x_j)) = \frac{v_{max}}{2}[\tanh(\Delta x_j(t) - h_c) + \tanh(h_c)]$$

wherein, $v_{max}$ denotes a maximum vehicle speed, $h_c$ denotes a safe distance between vehicles, and $\Delta x_j$(t) denotes an actual distance between vehicles at the moment t.

In the above technical solution, in the step 6, in response to a determination that the probability of lane-changing execution is greater than or equal to the execution threshold, the lane-changing trajectory of the specified vehicle and the longitudinal trajectory of the specified vehicle are updated, simultaneously, the longitudinal trajectory is determined based on a full velocity difference (FVD) model, and a lateral trajectory of the specified vehicle is determined by using a fifth degree polynomial, the fifth degree polynomial being represented as:

$y(t)=a_0+a_1 t+a_2 t^2+a_3 t^3+a_4 t^4+a_5 t^5$ wherein $A=[a_0, a_1, a_2, a_3, a_4, a_5]$ are coefficients of the fifth degree polynomial.

Compared to existing technologies, the beneficial effects of the method provided in the present disclosure may include but are not limited to:

1. To address the problems of high decision-making risk, low efficiency, and poor comfort in lane-changing processes caused by the uncertainty of side vehicle driving styles, the method adopts the concept of Bayesian game theory. By introducing prior and posterior prediction of vehicle driving styles of a side vehicle and combining probability estimates of whether the side vehicle will yield under different driving styles, the method establishes a decision-making algorithm with interactive deduction and inferential learning capabilities, which can achieve safer, more efficient, and more comfortable lane-changing decisions in mixed autonomous and human-driven traffic scenarios.
2. To address the uncertainty for the driving styles of the side vehicle and intentions of the side vehicle, particularly those influenced by factors such as time of day and traffic congestion, the preset disclosure proposes a method based on intelligent connected road perception and big data analysis, deducing priori prediction of side vehicle driving styles under different time periods and traffic flow conditions, aiming to uncover statistical patterns from traffic big data. The method holds the potential to unearth statistical regularities from large-scale traffic data and effectively support vehicle decision-making behaviors, thus enhancing decision-making efficiency and improving decision rationality.

BRIEF DESCRIPTION OF THE DRAWINGS

The present disclosure is further described in terms of exemplary embodiments. These exemplary embodiments are described in detail with reference to the drawings. These embodiments are non-limiting exemplary embodiments, in which like reference numerals represent similar structures throughout the several views of the drawings, and wherein:

FIG. 1 (b) is an exemplary schematic diagram illustrating the Bayesian game algorithm in FIG. 1 (a);

DETAILED DESCRIPTION

Figure 1A:
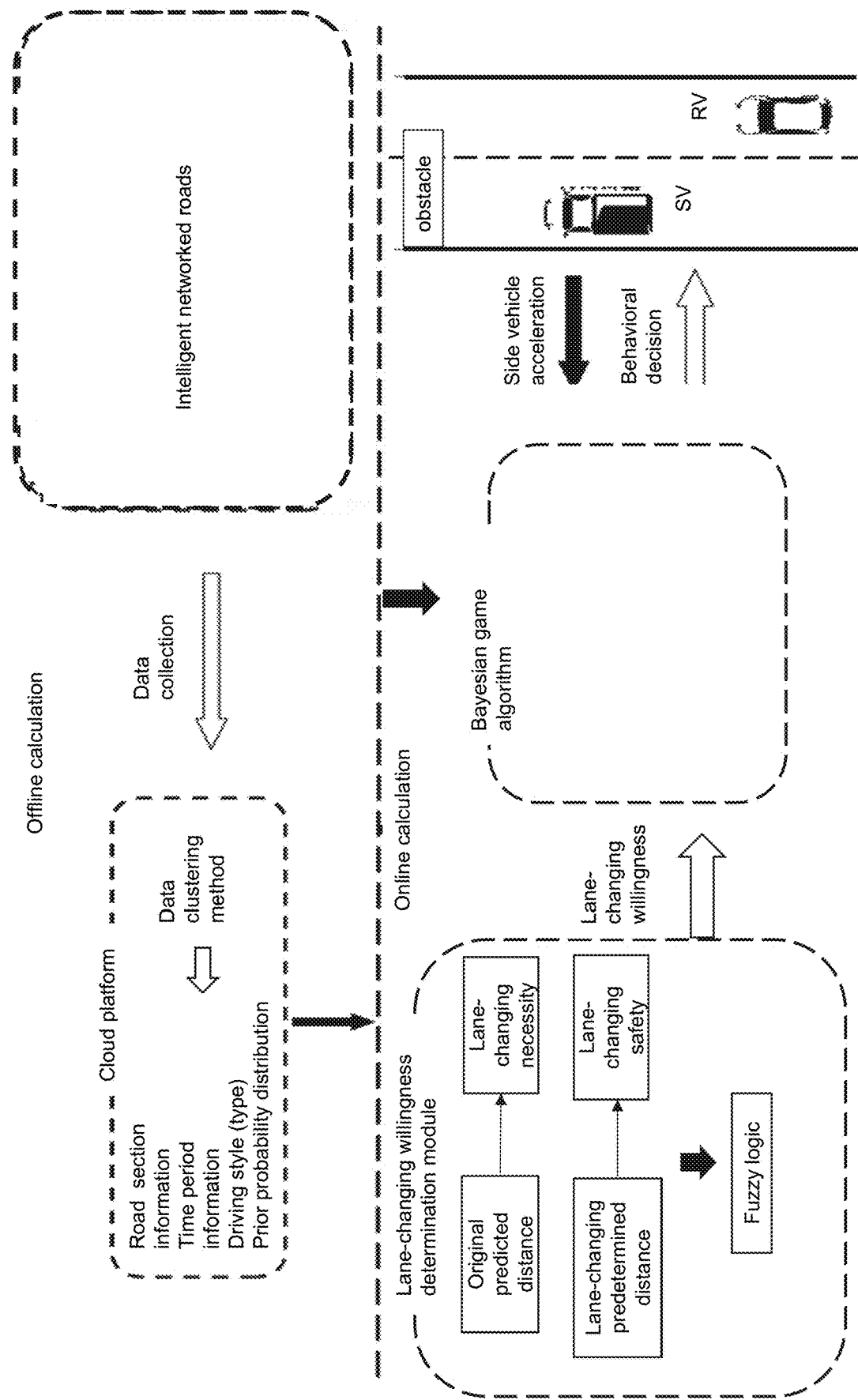
FIG. 1 (a) is an exemplary framework diagram illustrating a method for cooperative decision-making on lane-changing behavior of an autonomous vehicle based on Bayesian game according to some embodiments of the present disclosure.

In order to more clearly illustrate the technical solutions of the embodiments of the present disclosure, the accompanying drawings to be used in the description of the embodiments will be briefly described below. Obviously, the accompanying drawings in the following description are only some examples or embodiments of the present disclosure, and that the present disclosure may be applied to other similar scenarios in accordance with these drawings without creative labor for those of ordinary skill in the art. Unless obviously acquired from the context or the context illustrates otherwise, the same numeral in the drawings refers to the same structure or operation.

It should be understood that "system," "device," "unit," and/or "module" as used herein is a way to distinguish between different components, elements, parts, sections, or assemblies at different levels. However, these words may be replaced by other expressions if they accomplish the same purpose.

As indicated in the present disclosure and in the claims, the singular forms "a," "an," and "the" may be intended to include the plural forms as well, unless the context clearly indicates otherwise. In general, the terms "comprise," "comprises," and/or "comprising," "include," "includes," and/or "including," when used in this disclosure, specify the presence of stated features, integers, steps, operations, elements, and/or components, but do not preclude the presence or addition of one or more other features, integers, steps, operations, elements, components, and/or groups thereof.

Flowcharts are used in the present disclosure to illustrate the operations performed by the system according to some embodiments of the present disclosure. It should be understood that the operations described herein are not necessarily executed in a specific order. Instead, the operations may be executed in reverse order or simultaneously. Additionally, one or more other operations may be added to these processes, or one or more operations may be removed from these processes.

Figure 1B:
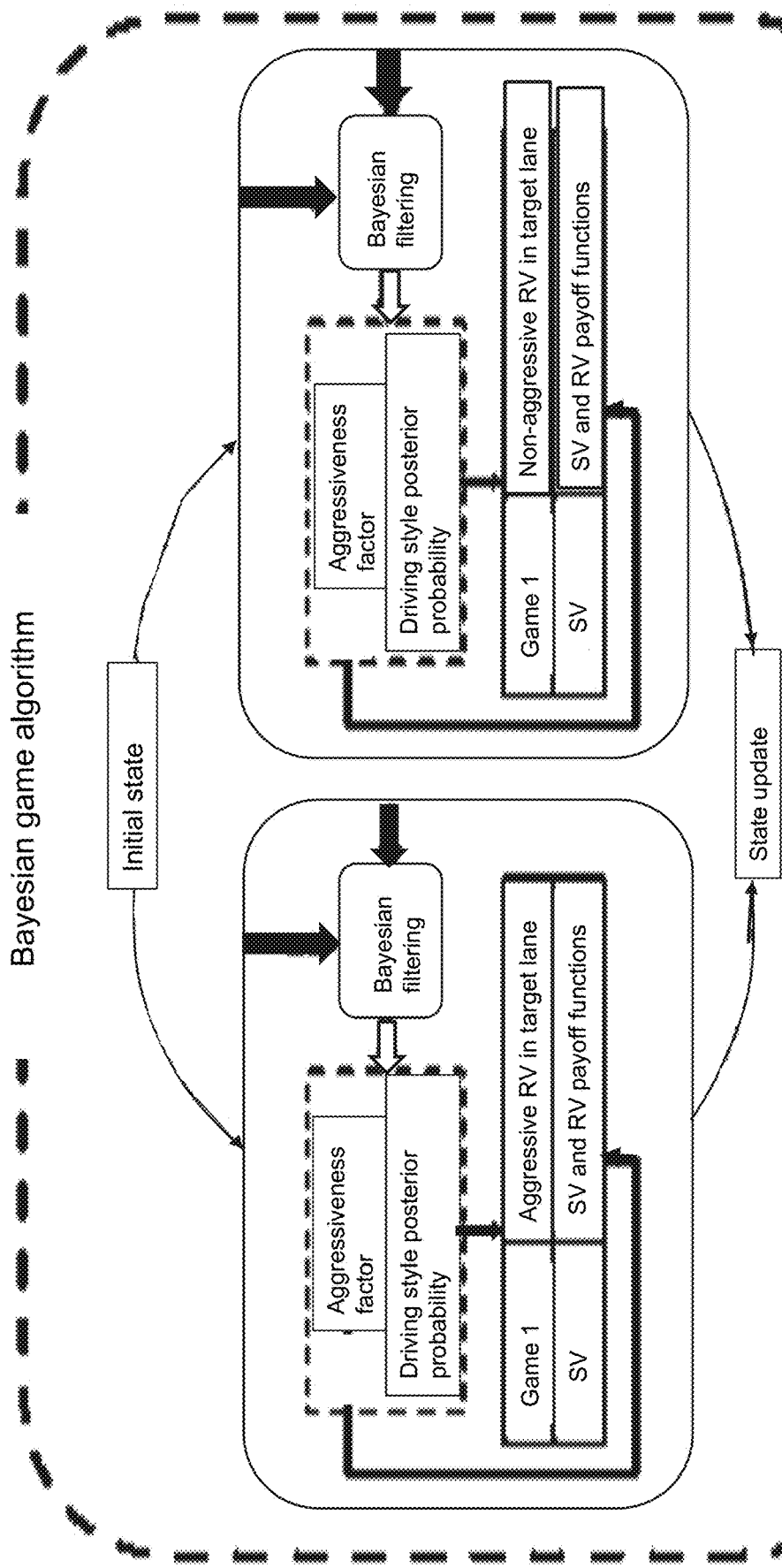

FIG. 1 (a) is an exemplary framework diagram illustrating a method for cooperative decision-making on lane-changing behavior of an autonomous vehicle based on Bayesian game according to some embodiments of the present disclosure. FIG. 1 (b) is an exemplary schematic diagram illustrating the Bayesian game algorithm in FIG. 1 (a).

As shown in FIGS. 1 (a) and 1 (b), the method for cooperative decision-making on lane-changing behavior of the autonomous vehicle based on Bayesian game may include:

Step 1: establishing a prior probability distribution of a vehicle driving style. Vehicle driving data may be obtained through an intelligent networked roadside sensor such as a visual camera, a Laser Imaging Detection and Ranging (LiDAR), etc.

In some embodiments, the vehicle driving style may include an aggressive driving style and a non-aggressive driving style. Vehicle speeds and accelerations under different time periods and different road sections may be recorded and statistically analyzed and designated as feature values for driving style classification. A k-means clustering algorithm may be used to determine a count of aggressive drivers n(A) and a count of non-aggressive drivers n(NA) for a given road section and time period. While the k-means clustering algorithm is used, other clustering algorithms may also be used.

Based on the above information, the prior probability distribution of the vehicle driving style $P_0(X|(road,time))$ may be solved, as shown in Equation (1):

$$\begin{cases} P_0(X|(\text{road, time})) = [p(A), 1 - p(A)] \\ p(A) = \dfrac{n(A)}{n(A) + n(NA)} \end{cases} \quad (1)$$

wherein, road and time denote the set road section and the set time period, respectively, p(A) denotes a probability that the vehicle driving style is aggressive, and 1−p(A) denotes a probability that the vehicle driving style is non-aggressive.

Figure 2:
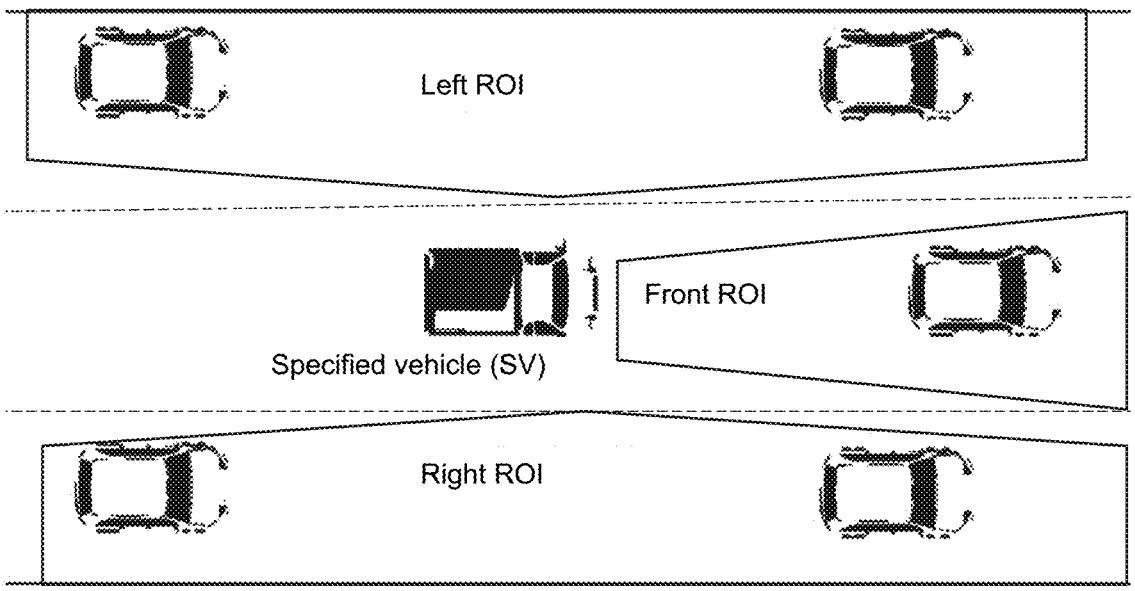
FIG. 2 is an exemplary schematic diagram illustrating division of regions of interest for a specified vehicle according to some embodiments of the present disclosure.

Step 2: outputting a lane-changing willingness through a lane-changing willingness determination module. A lane-change necessity and a lane-changing safety are necessary conditions for generating a lane-changing willingness. Vehicle information of a specified vehicle and a surrounding vehicle may be collected, and regions of interest (ROI) for the specified vehicle may be divided, as shown in FIG. 2, wherein the regions of interest include a front ROI, a left ROI, and a right ROI.

Figure 3:
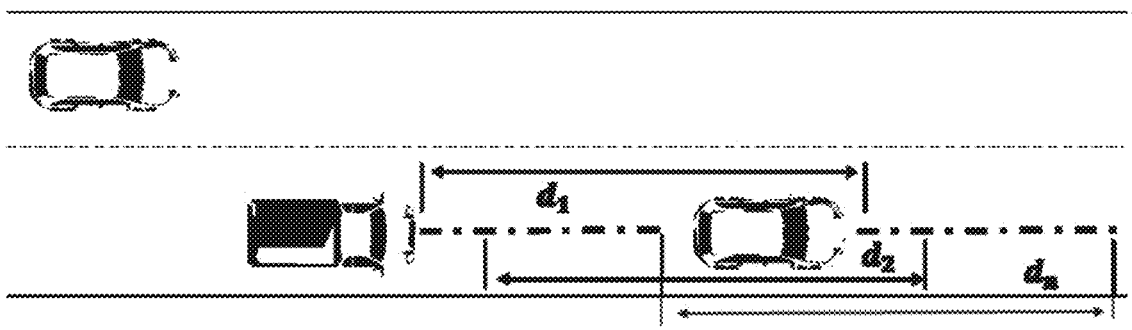
FIG. 3 is an exemplary schematic diagram illustrating determination of an original predetermined distance according to some embodiments of the present disclosure.
Figure 4:
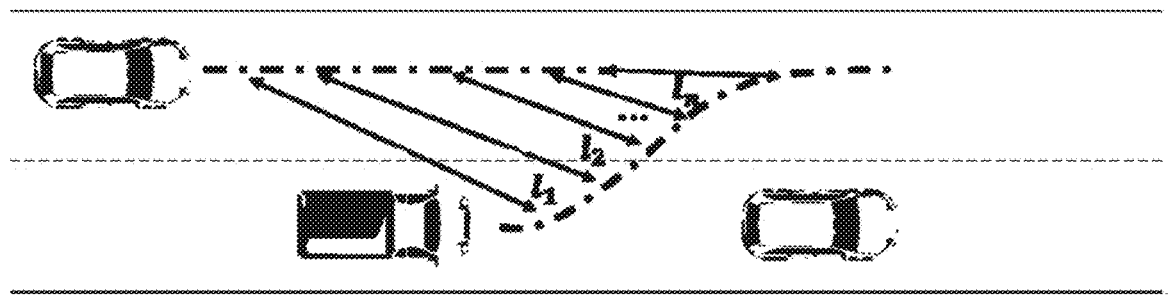
FIG. 4 is an exemplary schematic diagram illustrating determination of a lane-changing predetermined distance according to some embodiments of the present disclosure.

In some embodiments, as shown in FIG. 3, an original predetermined distance may be defined and determined as a minimum value $d_{min}$ of all predetermined distances $[d_1, d_2, \ldots, d_f]$ within a future time t. As shown in FIG. 4, a lane-changing predetermined distance may be defined and determined as a minimum value $l_{min}$ of all predetermined distances $[l_1, l_2, \ldots, l_f]$ within future time t. By introducing an expectation and a variance of a predetermined distance (e.g., the original predetermined distance or the lane-changing predetermined distance), a cumulative distribution function may be constructed to determine the lane-change necessity and the lane-changing safety, as shown in Equations (2)-(3):

$$P_{ne} = \frac{1}{\sigma\sqrt{2\pi}} \int e^{-\frac{(d_{min}-u_k)^2}{2\sigma^2}} dd_{min} \quad (2)$$

$$P_{sf} = \frac{1}{\sigma\sqrt{2\pi}} \int e^{-\frac{(l_{min}-u_l)^2}{2\sigma^2}} dl_{min} \quad (3)$$

wherein, $P_{ne}$ and $P_{sf}$ denote the lane-changing necessity and the lane-changing safety, respectively, $u_k$ and $u_l$ denote an expectation of the original predetermined distance and an expectation of the lane-changing predetermined distance, respectively, and $\sigma$ denotes the variance of the original predetermined distance and the variance of the lane-changing predetermined distance, respectively.

Figure 5:
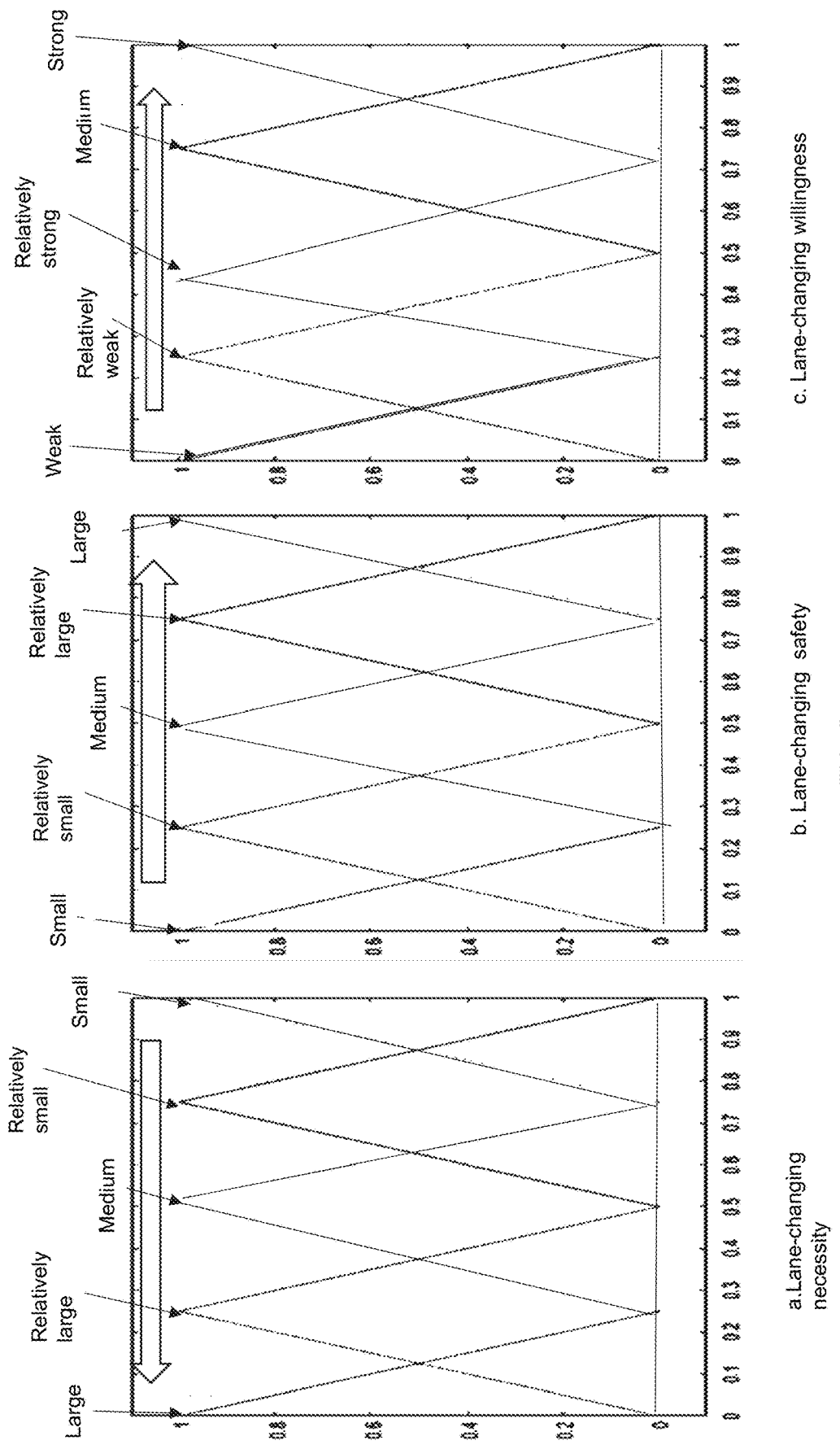
FIG. 5 is an exemplary schematic diagram illustrating determination of a lane-changing necessity, a lane-changing safety, and a lane-changing willingness according to some embodiments of the present disclosure.

A lane-changing willingness output model may be established based on fuzzy logic. First, an input and an output of the fuzzy logic-based lane-changing willingness model may be designed. As shown in FIGS. 5 (*a*), 5 (*b*), and 5 (*c*), a membership function of each of the lane-changing necessity, the lane-changing safety, and the lane-changing willingness may be constructed. Fuzzy sets for the input, i.e., the lane-changing necessity and the lane-changing safety may be {small, relatively small, medium, relatively large, large}, and the fuzzy set for the output, i.e., the lane-changing willingness, may be {weak, relatively weak, medium, relatively strong, strong}. Finally, a lane-changing willingness PLC may be obtained by performing a defuzzification operation according to a fuzzy rule table (e.g., as shown in Table 1) and a center of mass technique. Recommended fuzzy set classifications and fuzzy rule formulations are provided in Table 1 but not limited to the forms in the table.

vehicle driving style of the rear vehicle in the target lane may be determined based on an acceleration of the rear vehicle in the target lane acquired by an on-board sensor. A measurement accuracy for the acceleration of the rear vehicle in the target lane, denoted as y, may be obtained from a design parameter of the on-board sensor. The likelihood function of a driving state of the rear vehicle in the target lane being a non-decelerating state may be determined, denoted as $L(\theta|A)=(y, 1-y)$, and the likelihood function of the driving state of the rear vehicle in the target lane being a decelerating state may be determined, denoted as $L(\theta|NA)=(1-y, y)$.

A posterior probability distribution $P_t(Y|(road,time))$ of the vehicle driving style of the rear vehicle in the target lane may be obtained based on the prior probability distribution of the vehicle driving style and the likelihood function, using Equation (4):

$$P_t(Y|(road,time))=\text{normalize}(P_0(X(road,time)*L(\theta)) \quad (4)$$

wherein normalize denotes a normalization function.

If the lane-changing decision is not completed or the lane-changing intention persists, the driving state may be updated continuously, and the posterior probability of the vehicle driving style of the rear vehicle in the target lane at a moment t may be iteratively computed as $P_t(Y|(road, time))$. A posterior probability distribution at a moment t may be designated as a prior probability distribution at a moment t+1. A driver aggressiveness factor $\beta_t$ of the rear vehicle in the target lane at the moment t may be obtained based on the posteriori probability distribution of the vehicle driving style using Equation (5):

$$\beta_t = V_{type} \cdot P_t(Y|(road,time)) \quad (5)$$

wherein $V_{type}$ denotes a unit vector, for example, (1,0) represents an aggressive driving style, and (0,1) represents a non-aggressive driving style.

Step 4: predicting a vehicle behavior

The purpose of vehicle behavior prediction is to forecast driving trajectories, driving speeds, and accelerations of the specified vehicle and the rear vehicle in the target lane in a

TABLE 1

Fuzzy Rule Table

| lane-changing willingness | | lane-changing necessity | | | | |
|---|---|---|---|---|---|---|
| | | Large | Relatively large | Medium | Relatively small | Small |
| lane-changing safety | Large | Strong | Strong | Relatively strong | Relatively weak | Relatively weak |
| | Relatively large | Strong | Relatively strong | Medium | Weak | Weak |
| | Medium | Relatively strong | Medium | Relatively weak | Weak | Weak |
| | Relatively small | Medium | Relatively weak | Weak | Weak | Weak |
| | Small | Weak | Weak | Weak | Weak | Weak |

In response to a determination that the lane-changing willingness $\varphi_{LC}$ is greater than a lane-changing willingness threshold $\varphi_{dier}$, subsequent Bayesian game-based lane-changing decision-making process may be performed. The lane-changing willingness threshold $\varphi_{dier}$ may be set manually based on an actual condition.

Step 3: inferring a posterior probability of the vehicle driving style of a rear vehicle in a target lane using Bayesian filtering.

Figure 6:
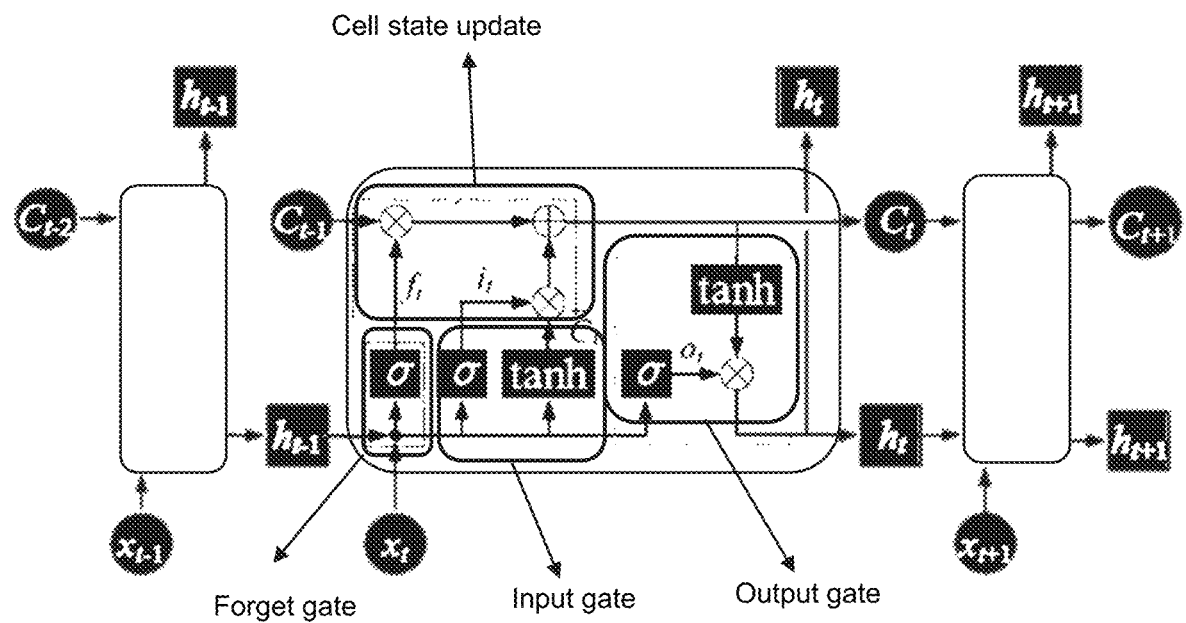
FIG. 6 is an exemplary schematic diagram illustrating a Long Short-Term Memory (LSTM) neural network according to some embodiments of the present disclosure.

In some embodiments, if the specified vehicle develops the lane-changing willingness, a likelihood function of the future-projected time domain H. The trajectories may be represented by discrete path points at future times $(x_{t'}, y_{t'})$, and the speeds and accelerations may be denoted by $v(t')$ and $a(t')$, respectively. The speeds and accelerations of the specified vehicle and the rear vehicle in the target lane in a future-projected time domain H may be predicted using a Long Short-Term Memory (LSTM) neural network. The structure of the LSTM neural network is shown in FIG. 6. The LSTM network includes a forget gate, an input gate, an output gate, and a cell state update. The characteristic feature of the LSTM network is the introduction of a gate mechanism to control the flow and loss of features, addressing the long-term dependency issues present in Recurrent Neural Networks (RNNs). LSTM generally performs better than Time Recursive Neural Networks and Hidden Markov Models (HMMs). Feature data, such as speed and acceleration, may be selected are used as data for one time step, outputting the predicted speed v(t') and acceleration a(t') in the future-projected time domain H.

The driving trajectories of the specified vehicle and the rear vehicle in the target lane under a non lane-changing behavior in the future-projected time domain H may be obtained through prediction based on the vehicular kinematic model by using Equation (6):

$$\begin{cases} \dot{x} = v \cos \varphi \\ \dot{y} = v \sin \varphi \end{cases} \quad (6)$$

wherein φ represents an actual heading of the vehicle (e.g., the specified vehicle or the rear vehicle, and v represents a predicted speed. A driving trajectory of a lane-changing behavior of the specified vehicle may be obtained based on the longitudinal trajectory deduced from the vehicular kinematic model and a lateral trajectory deduced from a fifth degree polynomial curve, which is described in detail later.

Step 5: establishing the payoff matrices for a non-cooperative game and determining a probability of lane-changing execution.

In some embodiments, the payoff matrices for the non-cooperative game may include a payoff matrix of the specified vehicle and an aggressive rear vehicle in the target lane, and a payoff matrix of the specified vehicle and a non-aggressive rear vehicle in the target lane, respectively. The payoff matrix of the specified vehicle and the aggressive rear vehicle in the target lane is shown in Table 2.

TABLE 2

Payoff matrix of the specified vehicle and the aggressive rear vehicle in the target lane

| | Aggressive rear vehicle in target lane | |
| --- | --- | --- |
| Specified vehicle | Decelerate | Accelerate |
| Lane change | ($U_{11}$, $Q_{11}$) | ($U_{12}$, $Q_{12}$) |
| No lane change | ($U_{21}$, $Q_{21}$) | ($U_{22}$, $Q_{22}$) |

The payoff matrix of the specified vehicle and the non-aggressive rear vehicle in the target lane is shown in Table 3.

TABLE 3

Payoff matrix of the specified vehicle and the non-aggressive rear vehicle in the target lane.

| | Non-aggressive rear vehicle in target lane | |
| --- | --- | --- |
| Specified vehicle | Decelerate | Accelerate |
| Lane change | ($U_{33}$, $Q_{33}$) | ($U_{34}$, $Q_{34}$) |
| No lane change | ($U_{43}$, $Q_{43}$) | ($U_{44}$, $Q_{44}$) |

The payoff of the specified vehicle and the payoff of the rear vehicle in the target lane are determined using a predictive modeling approach, computing the payoffs at future time points to enhance the predictability and safety of behavioral decisions. The payoffs includes four parts:

(1) A Safety Prediction Payoff.

Figure 7:
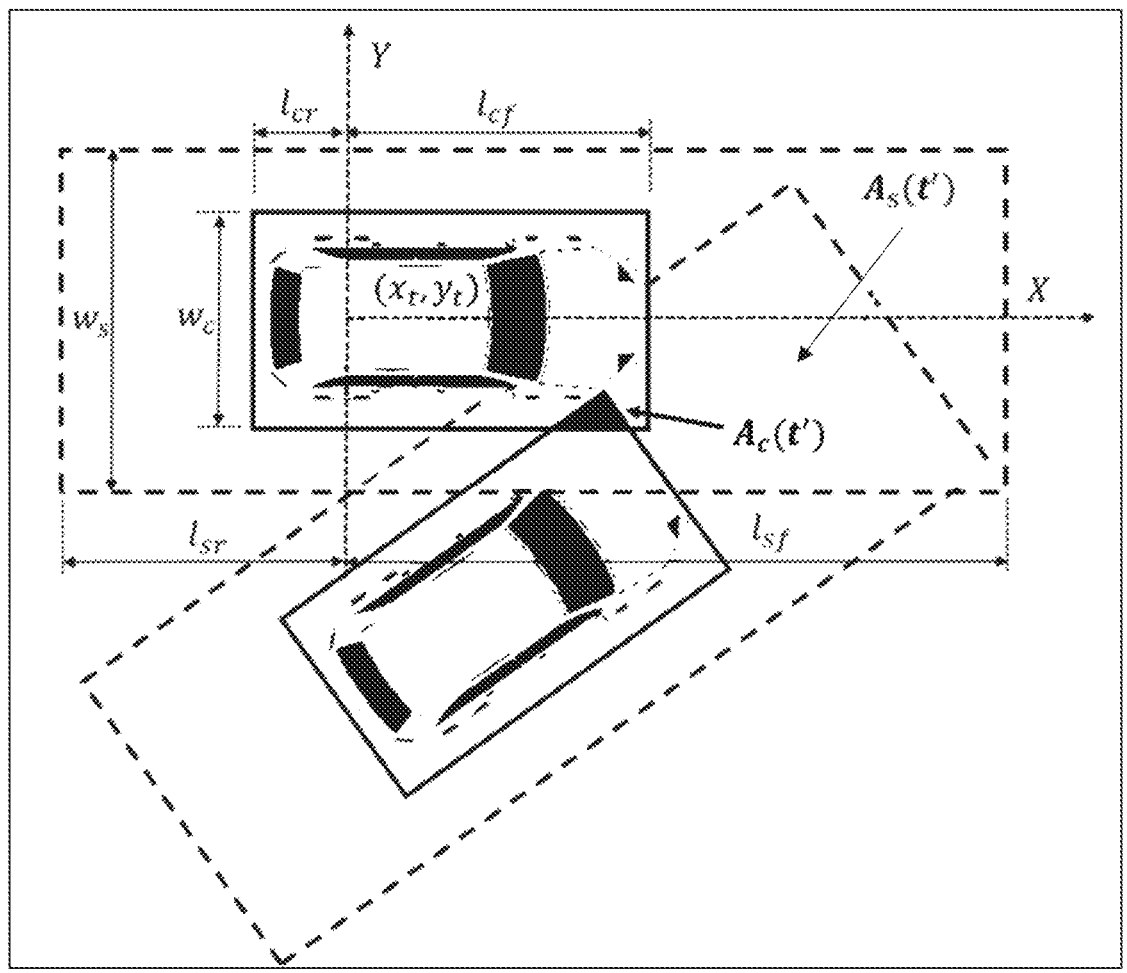
FIG. 7 is an exemplary schematic diagram illustrating determination of a safety prediction payoff according to some embodiments of the present disclosure.

Vehicle safety is one of the most important payoffs in intelligent vehicle driving. As shown in FIG. 7, the solid thick line represents vehicle collision determination regions, and the dashed thick line represents vehicle safety reservation regions. The safety prediction payoff may be determined using Equation (7):

$$\text{Term}(sf) = -\{\omega_{11}[A_c(t') + v_{SV}(t') * v_{RV}(t')] * I(A_c) + \omega_{12}[A_s(t') + v_{SV}(t') * v_{RV}(t')] * I(A_s)\} \quad (7)$$

wherein, $v_{SV}(t')$ and $v_{RV}(t')$ denote a driving speed of the specified vehicle and a driving speed of the rear vehicle in the target lane at a predicted moment t', respectively, $A_c(t')$ denotes an overlap area of the vehicle collision determination regions at the predicted moment t', $A_s(t')$ denotes an overlap area of the vehicle safety reservation regions at the predicted moment t'. The overlapping area $A_s(t')$ may be determined based on positioning points of the specified vehicle and the rear vehicle in the target lane obtained through on-board sensors, combined with manually set parameters $w_s$, $l_{sf}$, and $l_{sr}$ for the vehicle safety reservation regions. The overlapping area $A_c(t')$ may be determined based on manually set parameters $w_c$, $l_{cf}$, and $l_{cr}$ for the vehicle collision determination regions. $\omega_{11}$ and $\omega_{12}$ denote a collision weight and a safety reservation weight, respectively, which may be system preset values or system default values. $I(A_c)$ and $I(A_s)$ denote indicator functions. $I(A_c)$ takes a value of 1 when the vehicle collision determination regions overlap and takes a value of 0 when the vehicle collision determination regions do not overlap, $I(A_s)$ takes a value of 1 when the vehicle safety reservation regions overlap and takes a value of 0 when the vehicle safety reservation regions do not overlap. $I(A_c)$ may be expressed by Equation (8):

$$I(A_c) = \begin{cases} 1 & A_c > 0 \\ 0 & A_c = 0 \end{cases} \quad (8)$$

$I(A_s)$ may be expressed by Equation (9):

$$I(A_s) = \begin{cases} 1 & A_s > 0 \\ 0 & A_s = 0 \end{cases} \quad (9)$$

The predicted moment is a moment in the future-projected time domain H. $w_s$ represents a width of the vehicle safety reservation regions, and $l_{sf}$ represents a distance from a centroid of the rear vehicle in the target lane to one side of a vehicle safety reservation region, and Is, represents a distance from the centroid of the rear vehicle in the target lane to another side of the vehicle safety reservation region. A sum of $l_{sf}$ and $l_{sr}$ represents a length of the vehicle safety reservation region.

(2) A Time Prediction Payoff.

Another significant payoff of vehicle travel is reaching a destination in a shorter time. A faster speed results in more time payoff. Therefore, a speed of a target vehicle at the predicted moment, denoted as v(t'), may be designated as the time prediction payoff, and the time prediction payoff may be determined using Equation (10):

$$\text{Term(time)} = v(t') \quad (10)$$

The target vehicle refers to the vehicle for which the payoff is determined. The target vehicle may be the specified vehicle or the rear vehicle in the target lane.

(3) A Comfort Prediction Payoff.

Passenger comfort is also an important payoff in decision-making. A derivative, denoted as Jerk, of an acceleration of the specified vehicle or an acceleration of the rear vehicle in the target lane at the predicted moment t' during a vehicle driving process may be determined as the comfort prediction payoff, denoted by Equation (11):

$$\text{Term}(cf)=-|\text{Jerk}(t')| \quad (11)$$

A cooperation prediction payoff.

Considering an impact of a vehicle behavior decision of the specified vehicle on other traffic participants, an acceleration (t') of a side vehicle at the predicted time t' may be used as a quantitative index of the cooperation prediction payoff, where j denotes the number of the rear vehicle in the target lane. The side vehicle refers to another vehicle in the region where the target vehicle is located.

The cooperation prediction payoff may be determined using Equation (12):

$$\text{Term}(gt)=-|a_j(t')| \quad (12)$$

The total payoff includes the above four payoffs. The total payoff for the target vehicle may be determined by combining and weighting the above four payoffs. The payoffs of the specified vehicle and the rear vehicle in the target lane may be determined using Equations (13) and (14).

$$U=\Sigma_{t+1}{}^{H}(\omega_1\text{Term}(sf)+\omega_2\text{Term}(\text{time})+\omega_3\text{Term}(cf)+\omega_4\text{Term}(gt)) \quad (13)$$

$$Q=>\Sigma_{t+1}{}^{H}(\sigma_1\text{Term}(sf)+\sigma_2\text{Term}(\text{time})+\sigma_3\text{Term}(cf)+\sigma_4\text{Term}(gt)) \quad (14)$$

wherein, $\omega=[\omega_1, \omega_2, \omega_3, \omega_4]$ and $\sigma=[\sigma_1, \sigma_2, \sigma_3, \sigma_4]$, $\omega$ and $\sigma$ denote weight coefficients, H represents a total time of prediction, and t+1 denotes a next moment from a current moment. Because the payoff of the specified vehicle and the aggressive rear vehicle in the target lane and the payoff of the specified vehicle and the non-aggressive rear vehicle in the target lane are different, the driver aggressiveness factor $\beta_t$ may be used to construct the weight coefficients $\omega$ of the payoff U of the specified vehicle, using Equation (15):

$$\omega = \begin{cases} \omega_1 = k_1 * \beta_t \\ \omega_2 = k_2 * (1-\beta_t) \\ \omega_3 = k_3 * (1-\beta_t) \\ \omega_4 = k_4 * \beta_t \end{cases} \quad (15)$$

wherein $k=[k_1, k_2, k_3, k_4]$, $k_1$, $k_2$, $k_3$, and $k_4$ denote gain factors for the safety prediction payoff, the time prediction payoff, the comfort prediction payoff, and the cooperation prediction payoff, respectively, which aims to adjust and maintain the value of each prediction payoff at a same order of magnitude.

Coefficients $\sigma_1$, $\sigma_2$, $\sigma_3$, $\sigma_4$ may be obtained through manual calibration.

Figure 8:
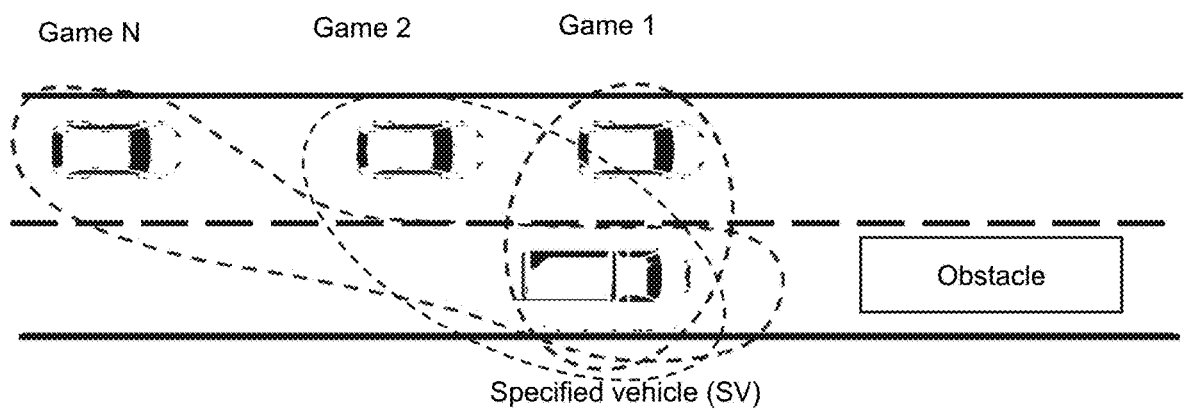
FIG. 8 is an exemplary schematic diagram illustrating establishment of multiple sets of lane-changing games according to some embodiments of the present disclosure.

As illustrated in FIG. 8, after generating the lane-changing willingness, the specified vehicle engages in multiple games with the rear vehicle in the target lane. The multiple games may be numbered based on a relative longitudinal distance between the rear vehicle in the target lane and the specified vehicle. For example, the games may be numbered as Game 1, Game 2, . . . , Game N. The purpose of lane-changing decision-making is to first complete Game 1, which specifically involves the specified vehicle completing a lane-changing behavior and moving forward of the rear vehicle in Game 1. If the lane-changing behavior cannot be completed during the process of solving the payoff matrix for Game 1, Games 2 to N may be renumbered as Game 1, Game 2, . . . , Game N. Subsequently, lane-changing decision-making may be continued by solving the probability of lane-changing execution for the renumbered Game 1.

The probability of lane-changing execution of the specified vehicle may be determined based on eight cases of the payoff matrix, the eight cases of the payoff matrix including the payoff matrix of the specified vehicle and the aggressive rear vehicle in the target lane, and the payoff matrix of the specified vehicle and the non-aggressive rear vehicle in the target lane. An expected payoff $E_p$ of the specified vehicle may be determined using Equation (16):

$$E_p=P_t(Y|(\text{road,time}))*[P_t(lc)*(U_{11}+U_{12})+(1-P_t(lc))* \\ (U_{21}+U_{22})]+(1-P_t(Y|(\text{road,time})))*[P_t(lc)*(U_{33}+ \\ U_{34})+(1-P_t(lc))*(U_{43}+U_{44})] \quad (16)$$

After reorganizing the above equation, the expected payoff $E_p$ of the specified vehicle may be expressed as a function of the lane-changing execution probability (lc), denoted as $E_p=(P_t(lc))$. The probability of lane change execution $P_t(lc)$ may be determined when the expected payoff $E_p$ is maximized.

Step 6: updating a vehicle state.

The lane-changing decision-making is a dynamic game process where the vehicle state is updated in real-time, and new decisions are made based on updated state information to complete the entire decision-making process. A process of updating the vehicle state may include two scenarios:

Scenario 1: If the probability of lane-changing execution $P_t{}^*(lc)$ is less than a predetermined execution threshold (lc), the specified vehicle does not execute lane-changing and only the longitudinal trajectory of the specified vehicle is updated. The longitudinal trajectory may be determined based on a full velocity difference (FVD) model, which demonstrates actual traffic phenomena such as stop-and-go behavior, sudden traffic jams, shockwaves, or the like, taking into account an effect of a speed difference being a positive or negative value. The longitudinal trajectory may be determined using Equation (17):

$$a_j(t)=\rho[V(\Delta(x_j))-v_j(t)]+\lambda\Delta v_j(t) \quad (17)$$

wherein j denotes a vehicle number, $a_j(t)$ denotes an acceleration at a moment t, $v_j(t)$ denotes a driving speed at the moment t, $\Delta v_j(t)$ denotes a speed difference at the moment t, $\rho$ and $\lambda$ denote weight coefficients, and $V(\Delta(x_j))$ denotes an optimized speed function, expressed by Equation (18):

$$V(\Delta(x_j)) = \frac{v_{max}}{2}[\tanh(\Delta x_j(t)-h_c)+\tanh(h_c)] \quad (18)$$

wherein, $v_{max}$ denotes a maximum vehicle speed, $h_c$ denotes a safe distance between vehicles, and $\Delta x_j(t)$ denotes an actual distance between vehicles at the moment t.

Scenario 2: If the probability of lane-changing execution $P_t(lc)$ is greater than or equal to the predetermined execution threshold (lc), the lane-changing trajectory of the specified vehicle and the longitudinal trajectory of the specified vehicle may be updated, simultaneously. The longitudinal trajectory may be determined based on the full velocity difference (FVD) model, and a lateral trajectory of the specified vehicle may be determined by using, but not limited to, a fifth degree polynomial, the fifth degree polynomial may be represented by Equation (19):

$$y(t)=a_0+a_1t+a_2t^2+a_3t^3+a_4t^4+a_5t^5 \qquad (19)$$

wherein A=[$a_0$, $a_1$, $a_2$, $a_3$, $a_4$, $a_5$] are coefficients of the fifth degree polynomial, t represents the sampling time during the lane-changing process, the values of $a_0$, $a_1$, $a_2$, $a_3$, $a_4$, $a_5$ may be set manually, and y(t) denotes a lateral position of the specified vehicle.

Step 7: cyclically executing dynamic game-based lane-changing decision-making.

Steps 3-6 may be cyclically performed until the lane-changing decision is executed or the lane-changing willingness disappears.

It should be noted that the above descriptions of the processes are merely for illustration and explanation and do not limit the scope of the present disclosure. Those skilled in the art may make various modifications and changes to the processes under the guidance of the present disclosure. However, such modifications and changes are still within the scope of the present disclosure.

Some embodiments of the present disclosure provide a system for cooperative decision-making on lane-changing behavior of an autonomous vehicle based on Bayesian game (hereinafter referred to as the lane-changing decision system). In some embodiments, the lane-changing decision system may include an intelligent networked roadside sensor, an on-board sensor of the specified vehicle (which collects information about the specified vehicle and a surrounding vehicle), a storage, and a processor, which are described below.

Figure 9:
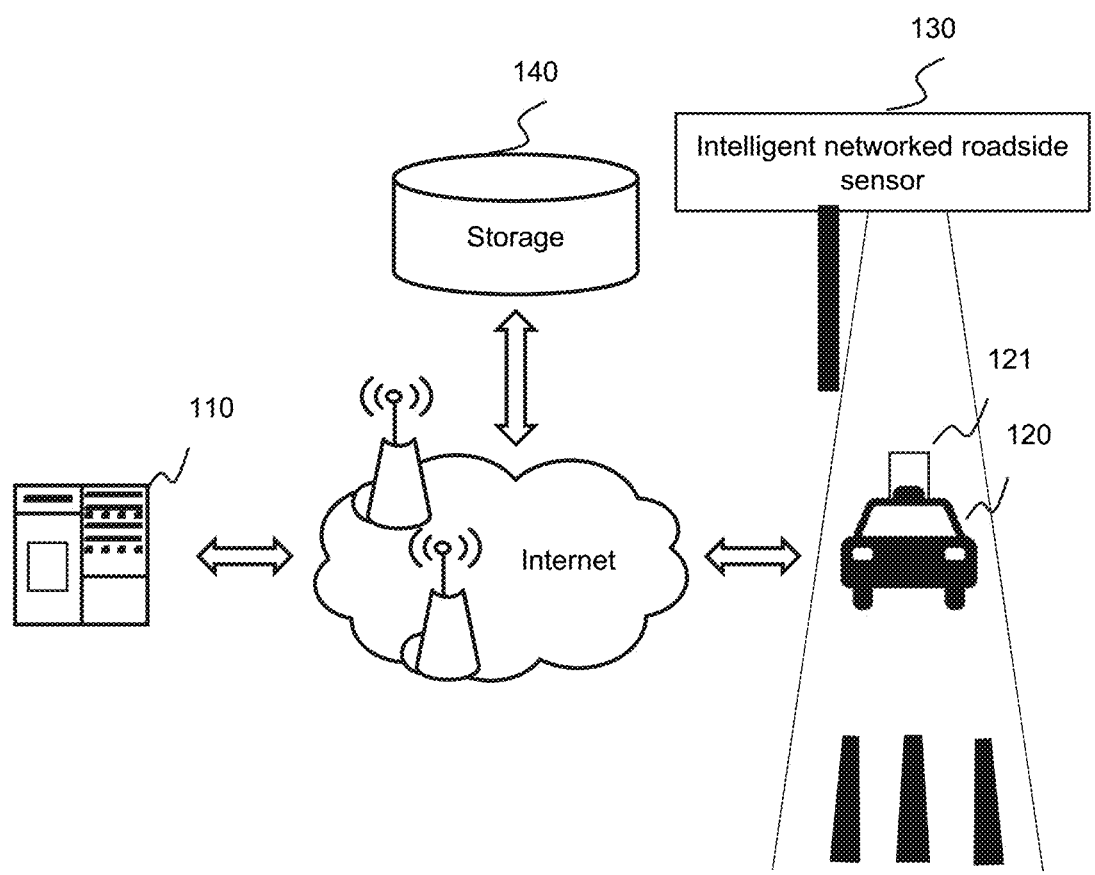
FIG. 9 is an exemplary schematic diagram illustrating an application scenario of a lane-changing decision system according to some embodiments of the present disclosure.

FIG. 9 is an exemplary schematic diagram illustrating an application scenario a lane-changing decision system according to some embodiments of the present disclosure. As shown in FIG. 9, a lane-changing decision system 900 may include a processor 110, an on-board sensor 121 of a vehicle 120, an intelligent networked roadside sensor 130, and a storage 140.

In some embodiments, the lane-changing decision system 900 may evaluate and control a lane-changing operation of a vehicle by implementing the methods and/or processes disclosed in the present disclosure.

The processor 110 may process data and/or information obtained from other devices or system components. Based on the obtained data, information, and/or processing results, the processor may execute program instructions to perform one or more functions described in the embodiments of the present disclosure. For example, the processor 110 may generate and execute a lane-changing willingness assessment instruction. More descriptions of generating and executing the lane-changing willingness assessment instruction may be found in FIG. 10 and the related descriptions thereof. In some embodiments, the processor 110 may be implemented on a cloud platform or provided virtually. In some embodiments, the storage 140 and the processor 110 may be integrated into the cloud platform.

The vehicle 120 may be an apparatus with autonomous driving capabilities, such as an autonomous vehicle. In some embodiments, the on-board sensor 121 may be deployed in the vehicle 120.

The on-board sensor 121 refers to a sensor used to detect and measure various operational states and environmental information. For example, the on-board sensor 121 may include a position and navigation sensor (e.g., GPS), a motion and attitude sensor (e.g., an Inertial Measurement Unit (IMU) and a wheel speed sensor), an environmental perception sensor (e.g., a radar and a Light Detection and Ranging (LiDAR)), a visual sensor (e.g., a camera), a distance measurement sensor (e.g., an ultrasonic sensor), or the like.

In some embodiments, the on-board sensor 121 may be installed on the vehicle 120. For example, the on-board sensor 121 may be mounted on an exterior of the vehicle 120 (e.g., on the roof, on the windshield, or on a rearview mirror).

In some embodiments, the vehicle 120 may include a central control unit, which may be configured to process data and/or information from the processor or the vehicle, and control an execution unit based on a processing result.

In some embodiments, the central control unit may communicate with the processor 110 via a network. For example, the central control unit may be signal-connected to the processor 110 via a mobile communication network for receiving various control instructions and information from the processor 110, or uploading vehicle data to the processor 110. In some embodiments, the central control unit may receive an instruction from the processor 110 and complete a corresponding task according to the instruction. For example, the central control unit may control the execution unit of the vehicle 120 to perform a braking operation, a deceleration operation, or the like, based on a braking control instruction issued by the processor 110.

The execution unit is configured to perform relevant operations, such as deceleration, steering, or braking operations. In some embodiments, the execution unit includes a steering device (e.g., a steering wheel), a braking device (e.g., a brake pedal), an accelerator, or the like. The steering device may be configured to adjust an orientation and/or a direction of the vehicle. The braking device may be configured to execute braking operations to stop the vehicle. The accelerator may be configured to control a speed and/or an acceleration of the vehicle.

The intelligent networked roadside sensor 130 are sensors used to collect and transmit information about the road environment and traffic conditions. For example, the intelligent networked roadside sensor 130 may include an imaging device (e.g., a visual camera), a LiDAR device, a Radio Detection and Ranging (RADAR) device, or the like. In some embodiment, the intelligent networked roadside sensor 130 may be installed on road infrastructure or a roadside. For example, the intelligent networked roadside sensor may be detachably mounted on a predetermined object on a road. The predetermined object may include a traffic signal, a street lamp, a utility pole, a tree, a building, or any combination thereof.

The storage 140 may store data and/or instructions. In some embodiments, the storage 140 may store data and/or instructions executable by the processor 110 to provide the methods or operations described in the embodiments of the present disclosure. In some embodiments, the storage 140 may store data (e.g., vehicle driving data, vehicle information of the specified vehicle and a surrounding vehicle, or the like) required during a decision-making process and intermediate data (e.g., the prior probability distribution of the vehicle driving style, the posterior probability distribution, the lane-changing necessity, the lane-changing safety, the lane-changing willingness, or the like) generated during the decision-making process. In some embodiments, one or more components of the lane-changing decision system 900 may access data or instructions stored in the storage 140 via a network. In some embodiments, the storage 140 may be implemented on a cloud platform. In some embodiments, the storage 140 may be integrated with or included in one or more other components (e.g., the processor 110, the specified vehicle) of the lane-changing decision system 900.

It should be noted that the lane-changing decision system 900 is provided merely for illustrative purposes and is not intended to limit the scope of the present disclosure. Various changes and modifications may be made by those skilled in the art based on the descriptions of the present disclosure. For example, the lane-changing decision system 900 may further include a database, an information source, or the like. As another example, the lane-changing decision system 900 may be implemented on other devices to achieve similar or different functions. However, these changes and modifications do not depart from the scope of the present disclosure.

Figure 10:
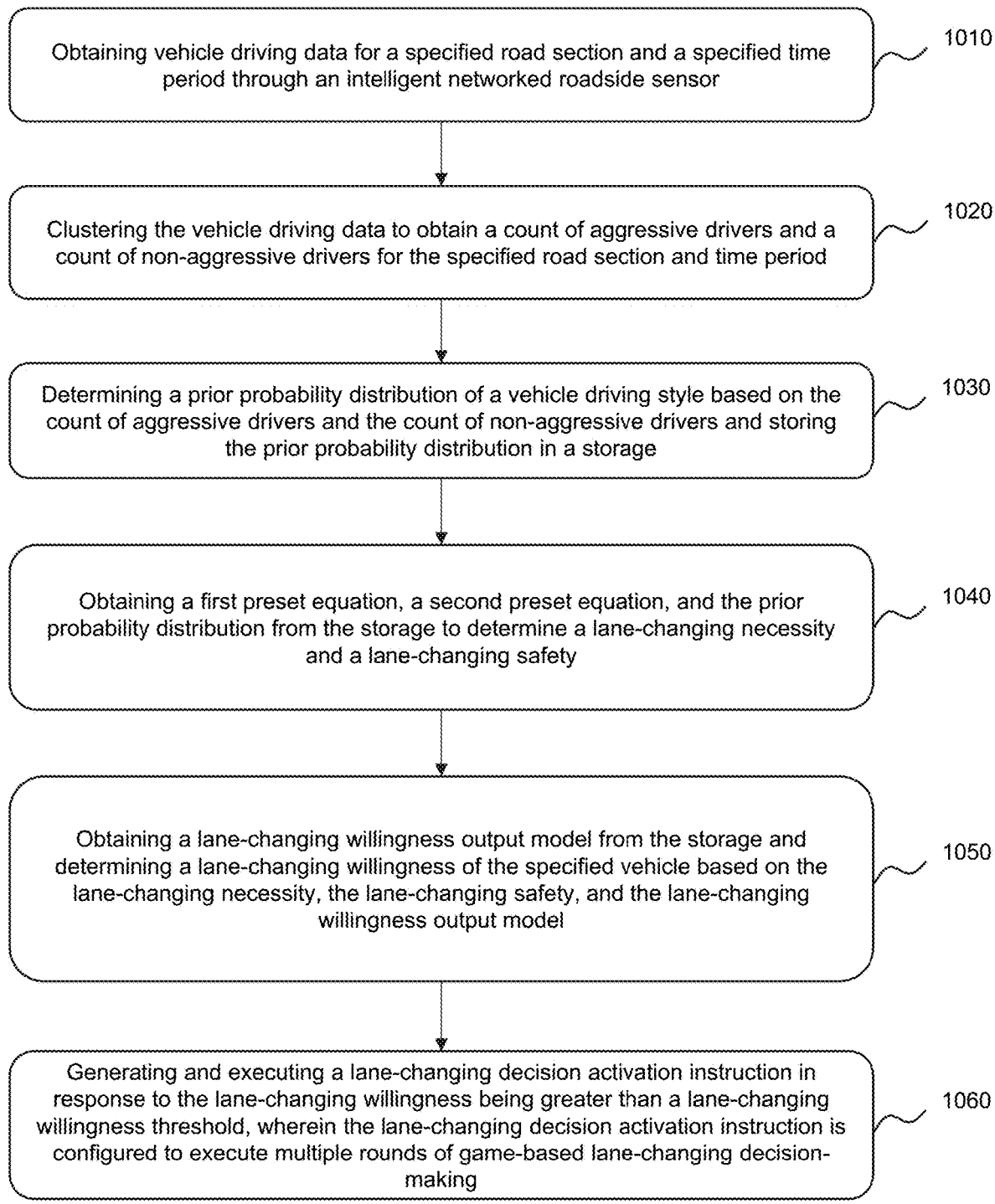
FIG. 10 is an exemplary flowchart illustrating a process of a decision-making method according to some embodiments of the present disclosure.

FIG. 10 is an exemplary flowchart illustrating a process of a decision-making method according to some embodiments of the present disclosure.

In some embodiments, a process 1000 may be executed based on the processor 110 of the lane-changing decision system. As shown in FIG. 10, the process 1000 includes the following operations:

In 1010, vehicle driving data for a set road section and a set time period may be obtained through an intelligent networked roadside sensor.

More descriptions of the intelligent networked roadside sensor may be found in FIG. 9 and the relevant descriptions thereof.

The vehicle driving data refers to various data related to vehicle driving. For example, the vehicle driving data may include one or more of an image and/or a video of an environment around a specified vehicle and/or a side vehicle, status data, a radar measurement result, or the like, or any combinations thereof.

The status data refers to information related to the state of the vehicle (e.g., the specified vehicle and/or the side vehicle). In some embodiments, the status data may include one or more of the vehicle's location data, road data, or the like, or any combinations thereof. The location data may include the vehicle's latitude and longitude data (which may be obtained through a positioning component on the vehicle). The road data may include the name of a road where the vehicle is located, or the like.

The radar measurement result may include a distance between objects on the road and the vehicle, the speed of the objects, the direction of the objects, the height of the objects, or the like.

In some embodiments, the vehicle driving data for the set road section and time period may be collected in real-time by the intelligent networked roadside sensor and uploaded to the processor via a network.

In some embodiments, the intelligent networked roadside sensor may collect a large amount of vehicle driving data from different time periods and road sections and upload the vehicle driving data to a storage device (e.g., the storage 140). The processor 110 may then read the vehicle driving data from the storage device. More descriptions of the processor 110 and the storage 140 may be found in FIG. 9 and the related descriptions thereof.

In 1020, the vehicle driving data may be clustered to obtain a count of aggressive drivers and a count of non-aggressive drivers for the set road section and time period. More descriptions of the clustering, the aggressive driving style, and the non-aggressive driving style may be found in FIGS. 1 (a) and 1 (b) and the related descriptions thereof.

In some embodiments, the processor 110 may extract a feature value reflecting a vehicle driving style from the collected vehicle driving data, such as an average speed, a standard deviation of acceleration, a maximum speed, a braking frequency, a count of overtakes, a lane-changing frequency, or the like. The extraction manner may include, but are not limited to, time series analysis, statistical analysis, or the like.

In some embodiments, the processor 110 may classify the feature value of each vehicle driving data using a clustering algorithm to determine a count of occurrences of each vehicle driving style. The clustering algorithm may include, but are not limited to, K-means, Density-Based Spatial Clustering of Applications with Noise (DBSCAN), Gaussian Mixture Model (GMM), or the like. For example, the processor may determine the vehicle driving style as aggressive if the driving speed, acceleration, braking frequency, etc., exceed their respective thresholds, and determine the vehicle driving style as non-aggressive if the driving speed, acceleration, braking frequency, etc., are below their respective thresholds.

In 1030, the prior probability distribution of a vehicle driving style may be determined based on the count of aggressive drivers and the count of non-aggressive drivers and stored in the storage 140.

The vehicle driving style refers to the personalized behavior characteristics exhibited by a driver while operating a vehicle. In some embodiments, the vehicle driving style includes two types: an aggressive driving style and a non-aggressive driving style. The aggressive driving style indicates that the driver tends to accelerate quickly, change lanes frequently, drive at high speeds, or the like. The non-aggressive driving style indicates that the driver tends to accelerate smoothly, change lanes cautiously, or the like.

A prior probability refers to the estimated probability of a driver exhibiting a certain driving style based on statistical or theoretical assumptions, before directly observing specific driving behavior data. The prior probability reflects an expected likelihood of encountering a particular style (e.g., the aggressive driving style or the non-aggressive driving style) of driver on a set road section during a set time period. For example, the prior probability may be expressed using a conditional probability P(style|condition) to represent the probability of encountering a certain driving style under a given condition. The prior probability distribution is a function representing prior probabilities of different driving styles.

In some embodiments, the processor may determine a frequency of each vehicle driving style based on a count of occurrences of the vehicle driving style, and designate the frequency as the prior probability for the vehicle driving style, thereby obtaining the prior probability distribution.

More descriptions of determining the prior probability distribution may be found in FIGS. 1 (a) and 1 (b) and the related descriptions thereof.

In 1040, a first preset equation, a second preset equation, and the prior probability distribution may be obtained from the storage 140 to determine a lane-changing necessity and a lane-changing safety. Based on the first preset equation, the second preset equation, and the prior probability distribution, the lane-changing necessity and lane-changing safety for the specified vehicle may be determined.

The lane-changing necessity refers to a result of evaluating the need for a lane-changing action based on a traffic condition and a driving requirement of the specified vehicle. In some embodiments, the lane-changing necessity may be expressed as a numerical value (e.g., a necessity degree, a necessity value, or the like), a grade (e.g., a necessity level), or the like.

The lane-changing safety refers to a result of evaluating the safety and feasibility of a lane-changing action at a current moment. In some embodiments, the lane-changing safety may be expressed as a numerical value (e.g., a safety degree, a safety value, or the like), a grade (e.g., a safety level), or the like.

In some embodiments, the processor 110 may use various techniques such as manual analysis, theoretical calculation, and/or modeling to process vehicle information of the specified current vehicle and a surrounding vehicle to determine the lane-changing necessity and the lane-changing safety.

In some embodiments, the processor 110 may determine a region of interest for the specified vehicle based on the vehicle information of the specified vehicle and the surrounding vehicle, and determined the lane-changing necessity and the lane-changing safety based on a predetermined distance between the specified vehicle and the surrounding vehicle in the region of interest.

The specified vehicle refers to the vehicle for which the lane-changing evaluation is performed.

The surrounding vehicle refers to another vehicle located within the region where the specified vehicle is located. For example, the surrounding vehicle may include but are not limited to a vehicle in front of a current lane, a vehicle behind the current lane, a vehicle in front of an adjacent left lane, a vehicle behind the adjacent left lane, a vehicle in front of an adjacent right lane, a vehicle behind the adjacent right lane, or the like.

The vehicle information refers to information related to the vehicle (e.g., the specified vehicle and the surrounding vehicle). For example, the vehicle information may include one of a driving speed, a driving direction, an acceleration, etc., of the vehicle, or any combination thereof.

In some embodiments, the processor 110 may obtain the vehicle information of the specified vehicle and the surrounding vehicle in real-time or periodically from an on-board sensor.

In some embodiments, the processor 110 may divide the region of interest of the specified vehicle to obtain a forward region of interest, a left region of interest, and a right region of interest. The region of interest is a spatial region where environmental information that significantly influences the lane-changing decision of the specified vehicle is located. By way of example, the processor may divide the region of interest based on a lane, a driving direction, a preset distance, or the like. For example, the processor may determine a range of preset distances in front of the current lane as the forward region of interest; a range of preset distances in front and behind the left adjacent lane of the specified vehicle as the left region of interest; and a range of preset distances in front and behind the right adjacent lane of the specified vehicle as the right region of interest.

In some embodiments, the predetermined distance includes one of an original predetermined distance or a lane-changing predetermined distance.

The original predetermined distance refers to a distance between the specified vehicle and a leading vehicle on the current lane when not considering the lane-changing action. For example, the original predetermined distance may be a minimum distance between reference points of the specified vehicle and reference points of the leading vehicle at various future moments. As another example, the original predetermined distance may include distances between the reference points of the specified vehicle and the reference points of the leading vehicle at various future moments. The reference points may be manually preset values or system default values, such as the midpoint of the vehicle's front.

The lane-changing predetermined distance refers to a distance between the specified vehicle and a rear vehicle in a shifted lane during a lane-changing process. For example, the lane-changing predetermined distance may be a minimum distance between the reference points of the specified vehicle and reference points of the rear vehicle in the shifted lane at various future moments. As another example, the lane-changing predetermined distance may include distances between the reference points of the specified vehicle and the reference points of the rear vehicle in the shifted lane at various future moments.

In some embodiments, the processor 110 may determine the leading vehicle based on the forward region of interest of the specified vehicle. The processor 110 may determine, based on the vehicle information of the specified vehicle and the leading vehicle, the original predetermined distance at each moment in a future time period by using various techniques such as manual analysis, theoretical calculation, and/or modeling.

In some embodiments, the processor 110 may determine a rear vehicle in a target lane based on the region of interest of the shifted lane after the lane change. The processor may determine, based on the vehicle information of the specified vehicle and the rear vehicle in the target lane, the lane-changing predetermined distance at each moment in the future time period by using various methods such as manual analysis, theoretical calculation, and/or modeling. The rear vehicle in the target lane refers to the vehicle following closely behind the specified vehicle after the lane change, and the target lane refers to the lane where the specified vehicle needs to change to.

In some embodiments, the processor 110 may establish the first preset equation based on an expectation and a variance of the original predetermined distance, and establish the second preset equation based on an expectation and a variance of the lane-changing predetermined distance.

In some embodiments, the processor 110 may determine the expectation and variance of the original predetermined distance based on the original predetermined distance at each moment in the future time period, and determine the expectation and variance of the lane-changing predetermined distance based on the lane-changing predetermined distance at each moment in the future time period. Based on the expectation and the variance of the original predetermined distance, the processor may construct a first cumulative distribution function, and based on the expectation and the variance of the lane-changing predetermined distance, the processor may construct a second cumulative distribution function. Based on the first cumulative distribution function and the first preset equation, the processor may determine the lane-changing necessity; based on the second cumulative distribution function and the second preset equation, the processor may determine the lane-changing safety.

The cumulative distribution function is used to describe a probability distribution of the original predetermined distance or a probability distribution of the lane-changing predetermined distance. For example, the cumulative distribution function may be a normal distribution, a Bernoulli distribution, or the like.

The first preset equation refers to an algorithm or equation used to determine the lane-changing necessity. For example, the first preset equation may be determined based on the first cumulative distribution function.

In some embodiments, the processor 110 may determine, based on the second cumulative distribution function (e.g., a normal distribution), the integral of the original predicted distance from negative infinity to the minimum original predicted distance as the first preset equation, thereby determining the lane-changing necessity. The first preset equation is expressed by Equation (2). More descriptions of the Equation (2) may be found in FIGS. 1 (a) and 1 (b) and the related descriptions thereof.

The second preset equation refers to an algorithm or equation used to determine the lane-changing safety. For example, the second preset equation may be determined based on the second cumulative distribution function.

In some embodiments, the processor 110 may determine, based on the second cumulative distribution function (e.g., a normal distribution), the integral of the lane-changing predetermined distance from negative infinity to the minimum lane-changing predetermined distance as the second preset equation, thereby determining the lane-changing safety. The second preset equation is expressed by Equation (3). More descriptions of the Equation (3) may be found in FIGS. 1 (a) and 1 (b) and the related descriptions thereof.

In 1050, a lane-changing willingness output model may be obtained from the storage 140 and a lane-changing willingness of the specified vehicle may be determined based on the lane-changing necessity, the lane-changing safety, and the lane-changing willingness output model.

The lane-changing willingness output model is an algorithm or model used to determine the tendency of a vehicle to perform a lane change.

In some embodiments, the lane-changing willingness output model may include a membership function, a fuzzy rule table, and a preset defuzzification algorithm for the lane-changing necessity, the lane-changing safety, and the lane-changing willingness.

More descriptions of the lane-changing willingness output model, a membership function, and a fuzzy rule table may be found in FIGS. 1 (a) and 1 (b) and the related descriptions thereof.

In some embodiments, the processor 110 may initially establish the lane-changing willingness output model based on fuzzy logic and store the lane-changing willingness output model in the storage 140. The fuzzy logic is a process that uses a fuzzy set and a fuzzy rule to determine a parameter (e.g., the lane-changing willingness) related to lane-changing decision-making.

Different elements in a fuzzy set may have different membership degrees. A membership degree refers to a degree to which an element belongs to the corresponding fuzzy set. In some embodiments, the membership degree is a numerical value between 0 and 1.

In some embodiments, the processor 110 may identify factors that influence the lane-changing willingness, such as the lane-changing necessity, the lane-changing safety, a surrounding vehicle behavior, a road condition, or the like. For each factor, a fuzzy set may be defined, for example, dividing the lane-changing necessity into elements such as "small," "relatively small," "medium," "relatively large," "large," or the like. The processor 110 may establish membership functions based on each element in the fuzzy set to describe the membership degree of the element in the corresponding fuzzy set. The membership functions may be linear, triangular, trapezoidal, or any other shape. For example, for the membership function of "high lane-changing necessity," if the lane-changing necessity is 1, the value of the membership function is equal to or close to 1, if the lane-changing necessity is outside this range, the membership degree gradually decreases to 0.

The fuzzy rule may be an equation or a mapping relationship used to determine the lane-changing willingness. In some embodiments, the fuzzy rule may be determined based on prior knowledge or historical data. For example, the fuzzy rule may be represented through a fuzzy rule table. More descriptions of the fuzzy rule table may be found in FIGS. 1 (a) and 1 (b) and the related descriptions thereof.

In some embodiments, based on fuzzy sets corresponding to the lane-changing necessity and the lane-changing safety, the processor may map input variables (e.g., fuzzy sets corresponding to the lane-changing necessity and the lane-changing safety, respectively) to an output variable (e.g., a fuzzy set corresponding to the lane-changing willingness), thereby obtaining one or more fuzzy results.

In some embodiments, the processor may determine, based on membership degrees corresponding to the lane-changing necessity and the lane-changing safety respectively, one or more membership degrees corresponding to the one or more fuzzy results, respectively, by using a minimum membership method, a product method, etc.

In some embodiments, the processor may convert the one or more fuzzy results into a numerical value through a preset defuzzification algorithm. For example, the processor may determine a weighted average position (e.g., a centroid position) of the one or more fuzzy results as the numerical value $\varphi_{LC}$ of the final lane-changing willingness, where weights are determined by the membership degree of each of the one or more fuzzy result.

The preset defuzzification algorithm is an algorithm that converts fuzzy sets into precise numerical values. The preset defuzzification algorithm includes but is not limited to a center of mass technique, a maximum membership technique, a weighted average technique, etc.

In 1060, a lane-changing decision activation instruction may be generated and executed in response to the lane-changing willingness being greater than a lane-changing willingness threshold. The lane-changing decision activation instruction is configured to execute multiple rounds of game-based lane-changing decision-making.

The lane-changing decision activation instruction is a series of operational instructions or scripts for performing multiple rounds of game-based lane-changing decision-making based on Bayesian filtering. Each round represents the execution of a dynamic game-based lane-changing decision. More descriptions of the game-based lane-changing decision-making may be found in FIGS. 1 (a) and 1 (b) and the related descriptions thereof.

In some embodiments, at least one round of game-based lane-changing decision-making may include the following operations S1-S6:

S1, collecting an acceleration of a rear vehicle in a target lane using an on-board sensor.

S2, determining, based on a prior probability distribution and the acceleration, a posterior probability distribution of vehicle driving styles and a driver aggressiveness factor and store the posterior probability distribution and the driver aggressiveness factor in the storage.

The posterior probability refers to a conditional probability of estimating the driving style exhibited by a driver based on actual observation data (e.g., the acceleration, the driving speed) collected while a side vehicle is in motion. The posterior probability distribution is a function representing the posterior probability of different vehicle driving styles.

In some embodiments, the processor may determine the posterior probability distribution of vehicle driving styles based on the prior probability distribution of the vehicle driving styles and a likelihood function (e.g., the probability of occurrence of driving speed and acceleration under different vehicle driving styles). For example, the processor may determine the posterior probability distribution of vehicle driving styles based on a product of the prior probability distribution of the vehicle driving styles and the likelihood function.

In some embodiments, the processor may determine the posterior probability distribution of vehicle driving styles based on the prior probability distribution of the vehicle driving styles and the likelihood function by using Equation (4). More descriptions of determining the posterior probability distribution may be found in FIGS. 1 (a) and 1 (b) and the related descriptions thereof.

The likelihood function of acceleration is used to measure the plausibility of a specific parameter (e.g., an expected acceleration value or a parameter of an acceleration distribution, such as a mean acceleration) for a given vehicle driving style.

In some embodiments, the processor may perform statistical analysis on historical data of the rear vehicle in the target lane to determine a statistical model (e.g., a normal distribution, a Bernoulli distribution, etc.), and determine the likelihood function of acceleration based on the statistical model. The statistical model is used to describe a relationship between observed acceleration and the vehicle driving style.

In some embodiments, after the specified vehicle generates a lane-changing willingness, the processor may obtain an acceleration of the rear vehicle in the target lane through the on-board sensor, and determine a measurement accuracy when measuring the acceleration based on a product design parameter of the on-board sensor. Based on the acceleration and the measurement accuracy, the processor may determine a likelihood function of a driving state of the rear vehicle in the target lane being a non-decelerating state and a likelihood function of the driving state of the rear vehicle in the target lane being a decelerating state.

The measurement accuracy refers to the consistency or closeness between a measured acceleration value and a true acceleration value.

In some embodiments, the processor may determine the measurement accuracy based on the product design parameter.

The product design parameter refers to a performance parameter related to the on-board sensor. For example, the product design parameter may include a measurement range, an accuracy, a resolution, etc., of an accelerometer.

More descriptions of the likelihood function and the posterior probability distribution may be found in FIGS. 1 (a) and 1 (b) and the related descriptions thereof.

In some embodiments, the processor may determine the driver aggressiveness factor for a future moment based on the posterior probability distribution of vehicle driving styles.

The driver aggressiveness factor is a quantitative indicator used to measure the degree of aggressiveness of a driver's driving behavior at a specific moment.

In some embodiments, the driver aggressiveness factor may range from 0 to 1.

For example, the processor may determine the driver aggressiveness factor for a current moment based on the posterior probability of vehicle driving styles using Equation (5). More descriptions of Equation (5) may be found in FIGS. 1 (a) and 1 (b) and the related descriptions thereof.

S3, obtaining a vehicular kinematic model and a trained Long Short-Term Memory (LSTM) neural network from the storage, predicting driving trajectories of the specified vehicle and the rear vehicle in the target lane in a future-projected time domain through the vehicle kinematic model, and predicting speeds and accelerations of the specified vehicle and the rear vehicle of the target lane in the future-projected time domain through the LSTM neural network.

The future-projected time domain refers to a period of time after the current moment.

In some embodiments, the processor may input speeds and accelerations of the specified vehicle and the rear vehicle in the target lane within a preset time period into the LSTM neural network to output the speeds and the accelerations of the specified vehicle and the rear vehicle in the target lane in the future-projected time domain. The speeds and accelerations of the specified vehicle and the rear vehicle in the target lane within the preset time period may include speeds and accelerations of the specified vehicle and the rear vehicle at different moments within the preset time period. The preset time period means a period of time that includes the current moment.

In some embodiments, the LSTM neural network may be trained based on a large number of labeled training samples through various feasible techniques. For example, parameter updates may be performed based on gradient descent. An exemplary training process may include: inputting a plurality of labeled training samples into an initial LSTM neural network, constructing a loss function from the labels and a result of the initial LSTM neural network, performing parameter updates based on the loss function via gradient descent or other techniques to iteratively update parameters of the initial LSTM neural network. The model training is completed when a preset condition is satisfied, and the LSTM neural network may be obtained. The preset condition may include the loss function converging, a count of iterations reaching a threshold, or the like.

In some embodiments, a count of the training samples may be a plurality, each of the plurality of training samples may include sample speeds and sample accelerations of a first time period. The sample speeds of the first time period include speeds at different moments within the first time period, and the sample accelerations of the first time period include accelerations at different moments within the first time period. The plurality of training samples may be obtained from historical data.

In some embodiments, the labels may include speeds and accelerations of a second time period. The labels may be obtained through manual labeling or labeled by the processor. The first time period and the second time period refer to historical time periods, and the second time period is after the first time period.

In some embodiments, when the processor trains the initial LSTM neural network based on different training samples, with different training samples corresponding to different learning rates. In some embodiments, the learning rate for each training sample is related to a variance of the sample speeds of the training sample.

The learning rate is a parameter used in a machine learning algorithm to control an update magnitude of a weight. In some embodiments, the learning rate is a configurable parameter used during the training of the LSTM neural network, and a value of the learning rate is a small positive value, for example, a value within the range between 0.0 and 1.0. The weight is a parameter used in the LSTM neural network to compute and estimate a relationship between samples input to and output from the LSTM neural network.

In some embodiments, the processor may initially set a fixed parameter value as the learning rate based on the initial LSTM neural network, and as the iterative training progresses, the learning rate may be dynamically adjusted.

In some embodiments, the learning rate of a training sample may be positively correlated with a variance of vehicle driving speeds in the training sample. For example, the higher the variance of the vehicle driving speeds in the training sample is, the higher the learning rate of that training sample is.

In some embodiments, for a vehicle that maintains constant speed in straight-line motion, there's a higher probability that a future driving speed of the vehicle will also maintain constant speed. Therefore, less attention is needed for such training samples, whereas training samples with more complex speed changes (e.g., significant speed fluctuations, variable driving states, etc.) may provide richer and more diverse features for the LSTM neural network, which facilitates the network in learning deeper driving patterns and underlying rules, thereby enhancing a prediction capability of the LSTM neural network.

A driving trajectory is a record of spatial positions that a vehicle passes through during its motion. For example, the driving trajectory of a vehicle may include positional information of the vehicle at different time points, including but not limited to latitude and longitude coordinates, altitude, driving speed, etc.

The vehicle kinematic model is a mathematical model used to describe and predict a motion characteristic of a vehicle in a two-dimensional (2D) or three-dimensional (3D) space. The processor may establish the vehicle kinematic model based on a vehicle coordinate system or other coordinate systems (e.g., an Earth-centered coordinate system). By way of example, as shown in Equation (6), x and y represent speed components of a vehicle (e.g., the specified vehicle or the rear vehicle) along a horizontal axis and a vertical axis of a coordinate system, respectively, wherein x and y are the derivatives of position coordinates along the horizontal and vertical axes with respect to time, respectively, indicating the rate of change of the vehicle's position. More descriptions of Equation (6) may be found in FIGS. 1 (a) and 1 (b) and the related descriptions thereof.

In some embodiments, the processor may predict the driving trajectories of the specified vehicle and the rear vehicle in the future-projected time domain based on a longitudinal trajectory obtained through prediction based on the vehicle kinematic model and a lateral trajectory obtained through prediction based on a fifth degree polynomial curve. The fifth-degree polynomial curve is a mathematical model used to describe smooth curve motion, which is suitable for vehicle path planning and trajectory prediction scenarios. In the trajectory prediction of vehicle lane-changing behavior, the fifth-degree polynomial may be used to predict a lateral position of a vehicle.

S4, obtaining payoff matrices from the storage and determining a probability of lane-changing execution based on the payoff matrices, the posterior probability distribution, the driver aggressiveness factor, and driving trajectories, speeds, and accelerations in the future-projected time domain.

The payoff matrices are used to evaluate and compare potential benefits that the specified vehicle and the rear vehicle in the target lane may obtain under different lane-changing strategies.

In some embodiments, the processor may identify participants (e.g., the specified vehicle and the rear vehicle in the target lane) of a game and determine all possible strategies that the specified vehicle and the rear vehicle in the target lane may adopt. For example, the specified vehicle may choose to change lanes or stay in the current lane, while the rear vehicle in the target lane may choose to decelerate or accelerate. A payoff matrix for a non-cooperative game may be constructed, where each row of the payoff matrix corresponds to a strategy of one participant and each column corresponds to a strategy of the other participant. Each cell in the payoff matrix contains two parameters representing the payoff of the two participants, such as (a, b), indicating that when the two participants adopt the corresponding strategies, one participant gains a payoff of a, and the other participant gains a payoff of b.

In a non-cooperative game, each participant independently makes decisions to maximize their own payoff, without considering the possibility of forming an alliance or an agreement.

More descriptions of the payoff matrix may be found in FIGS. 1 (a) and 1 (b) and the related descriptions thereof.

The probability of lane-changing execution refers to a likelihood of a vehicle deciding to perform a lane-changing operation.

In some embodiments, the processor may construct a payoff matrix for the specified vehicle and an aggressive rear vehicle under multiple lane-changing strategies and a payoff matrix for the specified vehicle and a non-aggressive rear vehicle under multiple lane-changing strategies, respectively. By organizing the matrices, a payoff function for the specified vehicle may be obtained, and the probability of lane-changing execution may be determined when an expected payoff Ep is maximized. The payoff function for the specified vehicle may include a functional relationship between the expected payoff the specified vehicle and the probability of lane-changing execution.

In some embodiments, the lane-changing strategies may include four strategies for the specified vehicle and the aggressive rear vehicle in the target lane, including: a strategy of [lane-changing, deceleration], a strategy of [lane-changing, acceleration], a strategy of [no lane-changing, deceleration], and a strategy of [no lane-changing, acceleration]; and four strategies for the specified vehicle and the non-aggressive rear vehicle in the target lane, including: a strategy of [lane-changing, deceleration], a strategy of [lane-changing, acceleration], a strategy of [no lane-changing, deceleration], and a strategy of [no lane-changing, acceleration].

In some embodiments, for each lane-changing strategy, the processor may determine four components of payoff, i.e., determine a safety prediction payoff of the specified vehicle at a future moment based on Equation (7); determine a time prediction payoff of the specified vehicle at the future moment based on Equation (10); determine a comfort prediction payoff of the specified vehicle at the future moment based on Equation (11); and determine a cooperation prediction payoff of the specified vehicle at the future moment based on Equation (12). Based on the safety prediction payoff and its weight $\omega_1$, the time prediction payoff and its weight $\omega_2$, the comfort prediction payoff and its $\omega_3$, and the cooperation prediction payoff and its $\omega_4$, the processor may determine a sub payoff of the specified vehicle at the future moment for the lane-changing strategy through Equation (13). A total payoff U of the specified vehicle in the future-projected time domain may be obtained by summing the sub-payoff of the specified vehicle at each future time moment of the future-projected time domain.

In some embodiments, the processor may determine a total payoff $U_{11}$ of the specified vehicle in the future-projected time domain under the strategy of [lane-changing, deceleration] with the aggressive rear vehicle in the target lane, a total payoff $U_{12}$ of the specified vehicle in the future-projected time domain under the strategy of [lane-changing, acceleration] with the aggressive rear vehicle in the target lane, a total payoff $U_{21}$ of the specified vehicle in the future-projected time domain under the strategy of [no lane-changing, deceleration] with the aggressive rear vehicle in the target lane, and a total payoff $U_{22}$ of the specified vehicle in the future-projected time domain under the strategy of [no lane-changing, acceleration] with the aggressive rear vehicle in the target lane based on the above manner.

In some embodiments, the processor may determine a total payoff $Q_{11}$ of the aggressive rear vehicle in the target lane in the future-projected time domain under the strategy of [lane-changing, deceleration] with the specified vehicle, a total payoff $Q_{12}$ of the aggressive rear vehicle in the target lane in the future-projected time domain under the strategy of [lane-changing, acceleration] with the specified vehicle, a total payoff $Q_{21}$ of the aggressive rear vehicle in the target lane in the future-projected time domain under the strategy of [no lane-changing, deceleration] with the specified vehicle, and a total payoff $Q_{22}$ of the aggressive rear vehicle in the target lane in the future-projected time domain under the strategy of [no lane-changing, acceleration] with the specified vehicle based on the above manner.

In some embodiments, the processor may determine a total payoff $U_{33}$ of the specified vehicle in the future-projected time domain under the strategy of [lane-changing, deceleration] with the non-aggressive rear vehicle in the target lane, a total payoff $U_{34}$ of the specified vehicle in the future-projected time domain under the strategy of [lane-changing, acceleration] with the non-aggressive rear vehicle in the target lane, a total payoff $U_{43}$ of the specified vehicle in the future-projected time domain under the strategy of [no lane-changing, deceleration] with the non-aggressive rear vehicle in the target lane, and a total payoff $U_{44}$ of the specified vehicle in the future-projected time domain under the strategy of [no lane-changing, acceleration] with the non-aggressive rear vehicle in the target lane based on the above manner.

In some embodiments, the processor may determine a total payoff $Q_{33}$ of the non-aggressive rear vehicle in the target lane in the future-projected time domain under the strategy of [lane-changing, deceleration] with the specified vehicle, a total payoff $Q_{34}$ of the non-aggressive rear vehicle in the target lane in the future-projected time domain under the strategy of [lane-changing, acceleration] with the specified vehicle, a total payoff $Q_{43}$ of the non-aggressive rear vehicle in the target lane in the future-projected time domain under the strategy of [no lane-changing, deceleration] with the specified vehicle, and a total payoff $Q_{44}$ of the non-aggressive rear vehicle in the target lane in the future-projected time domain under the strategy of [no lane-changing, acceleration] with the specified vehicle based on the above manner.

In some embodiments, the processor may establish a function of expected payoff of the specified vehicle based on the total payoffs $U_{11}$, $U_{12}$, $U_{21}$, $U_{22}$ $U_{33}$, $U_{34}$, $U_{43}$, $U_{44}$ under each lane-changing strategy with respect to the aggressive or non-aggressive rear vehicle in the target lane, and a lane-changing probability for the specified vehicle under each lane-changing strategy, using historical data or prior knowledge. Exemplarily, the function of expected payoff of the specified vehicle may be expressed by Equation (16).

In some embodiments, the processor may determine the lane-changing probability at the current moment by determining a value of the lane-changing probability corresponding to a maximum of the expected benefit function, using methods such as derivatives.

More descriptions of Equations (7), (8), (9), (10), (13), (14), and (16) may be found in FIGS. 1 (a) and 1 (b) and the related descriptions thereof.

In some embodiments, the parameters $w_s$ and $L_{sf}$ of the safety reservation region in Equation (7) may be determined based on an average relative speed change rate between the specified vehicle and the rear vehicle in the target lane.

The average relative speed change rate refers to a trend of relative speed changes between two vehicles (e.g., the specified vehicle and another reference vehicle, e.g., the rear vehicle in the target lane) at a plurality of consecutive time points over a period of time, which is used to reflect a degree of approach or separation between the two vehicles. A relative speed refers to the absolute value of a difference in driving speeds between the two vehicles.

In some embodiments, the processor may determine the average relative speed change rate based on the driving speeds of the specified vehicle and the rear vehicle in the target lane at a plurality of time points. For example, the processor may determine the relative speed of the two vehicles at each of the plurality of time points, and then determine an average of relative speeds of the two vehicles at the plurality of time points to obtain the average relative speed change rate.

In some embodiments, the parameters $w_s$ and $L_{sf}$ of the safety reservation region may be positively correlated with the average relative speed change rate. For example, the greater the average relative speed change rate is, the larger the parameters $w_s$ and $L_{sf}$ of the safety reservation region may be.

In some embodiments of the present disclosure, a greater trend in the relative speed change indicates a higher level of uncertainty during the lane-changing operation, which requires an appropriate expansion of the width parameter $w_s$ and the length ratio factor $l_s$ in the planning of the safety reservation region, thereby reserving a larger safety margin for the operation of a vehicle, and enhancing robustness of an autonomous driving system and its ability to adapt to complex road conditions.

S5, in response to the probability of lane-changing execution being less than or equal to an execution threshold, generating and executing a first update instruction, and sending an execution result to the storage.

The first update instruction refers to an instruction for updating the longitudinal trajectory of the specified vehicle.

The execution result refers the feedback of the updated longitudinal trajectory of the specified vehicle.

The execution threshold is a threshold condition for evaluating a manner for updating a vehicle state. The execution threshold may be a system preset value, a system default value, or the like.

In some embodiments, the execution threshold may be determined based on a neighborhood vehicle density.

The neighborhood vehicle density refers to the density of vehicles within a preset spatial range near the specified vehicle. The preset spatial range may be an area within a predetermined distance from the specified vehicle. A shape of the preset spatial range may be a triangle, a rectangle, a square, a hexagon, a circle, or the like. For example, the shape of the preset spatial range may be a rectangle with dimensions of M meters by N meters, where M and N may be predetermined values.

In some embodiments, the neighborhood vehicle density may be determined based on a count of vehicles within a predetermined neighborhood of the specified vehicle captured by the intelligent networked roadside sensor. The larger the count of vehicles within the predetermined neighborhood of the specified vehicle collected by the intelligent networked roadside sensor is, the greater the neighborhood vehicle density may be. By way of example, the count of vehicles within the predetermined neighborhood and the neighborhood vehicle density may take a same value.

In some embodiments, the execution threshold may be positively correlated with the neighborhood vehicle density, and the greater the neighborhood vehicle density is, the greater the execution threshold may be.

In some embodiments, the predetermined neighborhood range may be related to the current speed of the specified vehicle.

In some embodiments, the predetermined neighborhood range may be positively correlated with the current driving speed of the specified vehicle. For example, the greater the current driving speed is, the larger the predetermined neighborhood range may be.

In some embodiments of the present disclosure, adjusting the neighborhood range in conjunction with the vehicle speed facilitates better planning of a driving route, avoid frequent lane changes or emergency operations, and improve smoothness and comfort of driving. At high speeds, the lane-changing decision system can select an optimal path based on a wider field of view, reduce unnecessary speed changes, conserve energy, and improve road access efficiency.

In some embodiments of the present disclosure, in an autonomous driving system, an increase in the execution threshold means that the vehicle needs to satisfy a stricter condition before performing operations (e.g., lane-changing), which helps to reduce the risk of accidents due to misjudgment or overly aggressive operations, and ensures more robust and reliable driving behavior. In addition, when the neighborhood vehicle density increases, and the traffic situation becomes more complex and volatile. Therefore, increasing the execution threshold may prompt the autonomous driving system to evaluate the necessity and safety of each operation more cautiously, avoiding making too risky decisions when the neighborhood vehicle density is large.

The longitudinal trajectory refers to the vehicle's movement path along its driving direction (e.g., forward direction). For example, the longitudinal trajectory may include the vehicle's longitudinal speed, longitudinal acceleration, and longitudinal position at a given sampling moment. The longitudinal direction refers to a direction along a driving lane of the vehicle.

In some embodiments, in response to receiving the execution result of the first update instruction, the processor may take the posterior probability distribution of the vehicle driving style for a current round of iteration as the priori probability distribution of the vehicle driving style for a next round of iteration.

S6, in response to the probability of lane-changing execution being greater than the execution threshold, generating and sending a lane-changing instruction to the central control unit of the specified vehicle, generating and executing a second update instruction, and sending an execution result to the storage.

The lane-changing instruction is configured to make the specified vehicle to perform a lane change action.

The second update instruction is an instruction for updating the specified vehicle's lane-changing trajectory and longitudinal trajectory.

The lane-changing trajectory refers to the vehicle's movement path in the lateral direction (i.e., the direction of a width of the vehicle) during a lane change. For example, the lane-changing trajectory includes the vehicle's lateral position, lateral speed, and acceleration changes at a given sampling moment during the lane change. The lateral direction refers to a direction perpendicular to the driving lane or a road centerline.

In some embodiments, after obtaining the execution result of the second update instruction, the processor may determine whether an iteration condition is satisfied; if not, the processor may proceed to the next round of iteration.

In some embodiments, each round of game-based lane-changing decision-making is an iteration. The processor may execute results of multiple iterations to complete the lane-changing decision.

In some embodiments, an input of the multiple iterations may be related to a count of the multiple iterations. When a first iteration is conducted, the priori probability distribution of vehicle driving styles is determined based on Equation (1). For subsequent iterations, the priori probability distribution of vehicle driving styles for a next iteration is the posterior probability distribution of vehicle driving styles for a previous iteration.

In some embodiments, in a non-final iteration of at least one iteration, the processor may collect the acceleration of the rear vehicle in the target lane through the on-board sensor, determine the posterior probability distribution of vehicle driving styles and the driver aggressiveness factor based on the priori probability distribution and the acceleration, predict the driving trajectories, the driving speeds, and the accelerations of the specified vehicle and the rear vehicle in the target lane in the future-projected time domain based on the trained LSTM neural network, and determine the probability of lane-changing execution based on the revenue matrices, the posterior probability distribution, the driver aggressiveness factor, and the driving trajectories, the driving speeds, and the accelerations in the future-projected time domain. The processor may determine whether the iteration condition is satisfied, and in response to determining that the iteration condition is not satisfied, the processor may take the posterior probability distribution of vehicle driving styles of a current iteration as the priori probability distribution of vehicle driving styles of a next iteration and perform the next iteration.

The iteration condition is a judgment condition that determines whether an iteration is terminated. For example, the iteration condition may include completion of the lane-changing decision execution or the lane-changing willingness being less than a lane-changing willingness threshold value (i.e., disappearance of the lane-changing willingness).

In some embodiments, during the iterative execution of the lane-changing decision-making, after completing each iteration, the processor may generate and send a sampling adjustment instruction to the on-board sensor in response to a variance of the probability of lane-changing execution obtained from multiple completed iterations being greater than a variance threshold.

The sampling adjustment instruction is used to adjust operating parameters of the on-board sensor. For example, the operating parameters of the on-board sensor may include a data collection time interval, a measurement range, a sensitivity, or the like.

In some embodiments, the sampling adjustment instruction may include an adjustment magnitude and an adjustment direction corresponding to at least one on-board sensor. For example, the adjustment direction may include increasing or decreasing. The adjustment magnitude refers to a specific intensity or degree of change in the adjustment of the operating parameters of the on-board sensor.

The variance threshold is the minimum threshold condition for generating the sampling adjustment instruction.

In some embodiments, the variance threshold may be positively correlated to the driving speed of the specified vehicle at a current moment, and the greater the driving speed at the current moment is, the greater the variance threshold is.

In some embodiments, the processor may, in response to the variance of the probability of lane-changing execution being greater than the variance threshold, determine the corresponding adjustment direction based on a type of the on-board sensor and its operating parameters. For example, the adjustment direction of a scanning frequency of an on-board radar may be determined to be increasing, and the adjustment direction of a sampling interval of a LIDAR may be determined to be decreasing.

In some embodiments, the processor may preset the adjustment magnitude based on experience. In some embodiments, the adjustment magnitude may be positively correlated to the variance of the probability of lane-changing execution. In other words, the greater the variance of the probability of lane-changing execution is, the greater the adjustment magnitude may be.

In some embodiments, different on-board sensors may adjust their respective operating parameters based on the sampling adjustment instruction. For example, an on-board radar may increase the scanning frequency based on the sampling adjustment instruction, a vision camera may increase a frame rate based on the sampling adjustment instruction, or a LIDAR may shorten a point cloud data acquisition interval based on the sampling adjustment instruction.

In some embodiments of the present disclosure, if the probability of lane-changing execution continuously increases and the variance of the probability of lane-changing execution is relatively large, it indicates that a current road environment is very complex, which may result in a significant difference in a plurality of probabilities of lane change execution determined within a short period of time. By increasing the amount of data collected (by reducing a sampling interval), it is beneficial for the processor to perform more accurate computations, thereby improving the safety and reliability of lane-changing decisions.

One or more embodiments of the present disclosure further provide a control device for cooperative decision-making on lane-changing behavior of an autonomous vehicle based on Bayesian game. The device may include a processor, which may be configured to execute the method for cooperative decision-making on lane-changing behavior of an autonomous vehicle based on Bayesian game as described in any of the embodiments of the present disclosure.

One or more embodiments of the present disclosure further provide a computer-readable storage medium. The storage medium may store computer instructions, and when a computer reads the computer instructions in the storage medium, the computer runs the method for cooperative decision-making on lane-changing behavior of an autonomous vehicle based on Bayesian game as described in any of the embodiments of the present disclosure.

Having thus described the basic concepts, it may be rather apparent to those skilled in the art after reading this detailed disclosure that the foregoing detailed disclosure is intended to be presented by way of example only and is not limiting. Various alterations, improvements, and modifications may occur and are intended to those skilled in the art, though not expressly stated herein. These alterations, improvements, and modifications are intended to be suggested by this disclosure, and are within the spirit and scope of the exemplary embodiments of this disclosure.

Moreover, certain terminology has been used to describe embodiments of the present disclosure; For example, the terms "one embodiment," "an embodiment," and/or "some embodiments" mean that a particular feature, structure, or characteristic described in connection with the embodiment is included in at least one embodiment of the present disclosure; Therefore, it is emphasized and should be appreciated that two or more references to "an embodiment" or "one embodiment" or "an alternative embodiment" in various portions of this disclosure are not necessarily all referring to the same embodiment. Furthermore, the particular features, structures, or characteristics may be combined as suitable in one or more embodiments of the present disclosure.

Furthermore, the recited order of processing elements or sequences, or the use of numbers, letters, or other designations therefore, is not intended to limit the claimed processes and methods to any order except as may be specified in the claims. Although the above disclosure discusses through various examples what is currently considered to be a variety of useful embodiments of the disclosure, it is to be understood that such detail is solely for that purpose, and that the appended claims are not limited to the disclosed embodiments, but, on the contrary, are intended to cover modifications and equivalent arrangements that are within the spirit and scope of the disclosed embodiments. For example, although the implementation of various components described above may be embodied in a hardware device, it may also be implemented as a software only solution, e.g., an installation on an existing server or mobile device.

As another example, it should be appreciated that in the foregoing description of embodiments of the present disclosure, various features are sometimes grouped together in a single embodiment, figure, or description thereof for the purpose of streamlining the disclosure aiding in the understanding of one or more of the various inventive embodiments. This way of disclosure, however, is not to be interpreted as reflecting an intention that the claimed subject matter requires more features than are expressly recited in each claim. Rather, inventive embodiments lie in less than all features of a single foregoing disclosed embodiment.

In some embodiments, the numbers expressing quantities or properties used to describe and claim certain embodiments of the present disclosure are to be understood as being modified in some instances by the term "about," "approximate," or "substantially." For example, "about," "approximate," or "substantially" may indicate ±20% variation of the value it describes, unless otherwise stated. Accordingly, in some embodiments, the numerical parameter set forth in the written description and attached claims are approximations that may vary depending upon the desired properties sought to be obtained by a particular embodiment. In some embodiments, the numerical parameter should be construed in light of the number of reported significant digits and by applying ordinary rounding techniques. Notwithstanding that the numerical ranges and parameter setting forth the broad scope of some embodiments of the present disclosure are approximations, the numerical values set forth in the specific examples are reported as precisely as practicable.

Each of the patents, patent applications, publications of patent applications, and other material, such as articles, books, specifications, publications, documents, things, and/or the like, referenced herein is hereby incorporated herein by this reference in its entirety for all purposes, excepting any prosecution file history associated with same, any of same that is inconsistent with or in conflict with the present document, or any of same that may have a limiting effect as to the broadest scope of the claims now or later associated with the present document. By way of example, should there be any inconsistency or conflict between the description, definition, and/or the use of a term associated with any of the incorporated material and that associated with the present document, the description, definition, and/or the use of the term in the present document shall prevail.

In closing, it is to be understood that the embodiments of the present disclosure disclosed herein are illustrating of the principles of the embodiments of the present disclosure. Other modifications that may be employed may be within the scope of the present disclosure. Thus, by way of example, but not of limitation, alternative configurations of the embodiments of the present disclosure may be utilized in accordance with the teachings herein. Accordingly, embodiments of the present disclosure are not limited to that precisely as shown and described.

What is claimed is:

1. A method for cooperative decision-making on lane-changing behavior of an autonomous vehicle based on Bayesian game, the method comprising:

step 1, establishing a prior probability distribution of a vehicle driving style of a side vehicle, including: obtaining vehicle driving data through an intelligent networked roadside sensor, and recording and counting the prior probability distribution of the vehicle driving style under different time periods and different road sections, wherein the vehicle driving style of the side vehicle includes an aggressive driving style and a non-aggressive driving style;

step 2, outputting a lane-changing willingness through a lane-changing willingness determination module, including: collecting vehicle information of a specified vehicle and a surrounding vehicle through an on-board sensor, determining an original predetermined distance and a lane-changing predetermined distance, determining a lane-changing necessity and a lane-changing safety through a cumulative distribution function constructed by introducing an expectation and a variance, establishing a lane-changing willingness output model based on fuzzy logic, and executing following steps 3-7 in response to the lane-changing willingness reaching a lane-changing willingness threshold;

step 3, inferring a posterior probability of a vehicle driving style of a rear vehicle in a target lane using Bayesian filtering, including: in response to the lane-changing willingness of the specified vehicle reaching the lane-changing willingness threshold, determining a likelihood function of the vehicle driving style of the rear vehicle in the target lane based on an acceleration of the rear vehicle in the target lane acquired by the on-board sensor, and obtaining, through the likelihood function and the prior probability distribution, the posterior probability of the vehicle driving style of the rear vehicle in the target lane and a driver aggressiveness factor $\beta$ of the rear vehicle in the target lane, the driver aggressiveness factor having a value in a range of [0, 1];

step 4, predicting, through a Long Short-Term Memory (LSTM) neural network and a vehicle kinematic model, driving trajectories, driving speeds, and accelerations of the specified vehicle and the rear vehicle in the target lane in a future-projected time domain;

step 5, establishing payoff matrices and determining a probability of lane-changing execution, including: establishing payoff matrices for a non-cooperative game, wherein the payoff matrices for the non-cooperative game include a payoff matrix of the specified vehicle and an aggressive rear vehicle in the target lane, and a payoff matrix of the specified vehicle and a non-aggressive rear vehicle in the target lane, respectively, and payoff functions of the payoff matrices include a function of a safety prediction payoff, a function of a time prediction payoff, a function of a comfort prediction payoff, and a function of a cooperation prediction payoff, and obtaining the probability of lane-changing execution by solving the payoff matrix;

step 6, updating a vehicle state, including: in response to a determination that the probability of lane-changing execution is less than an execution threshold, the specified vehicle not executing a lane-changing, updating a longitudinal trajectory of the specified vehicle; and in response to a determination that the probability of lane-changing execution is greater than or equal to the execution threshold, updating a lane-changing trajectory and the longitudinal trajectory of the specified vehicle, simultaneously;

step 7, cyclically executing dynamic game-based lane-changing decision-making, including: cyclically executing steps 3-6 until an execution of a lane-changing strategy is completed or the lane-changing willingness disappears;

wherein, in the step 5, the payoff matrix of the specified vehicle and the aggressive rear vehicle in the target lane is: $(U_{11},Q_{11})$, $(U_{12},Q_{12})$, $(U_{21},Q_{21})$, and $(U_{22},Q_{22})$, wherein $U_{11}, U_{12}, U_{21}, U_{22}$ denote payoffs of the specified vehicle under a combination of four strategies with the aggressive rear vehicle in the target lane, which includes a strategy of [lane-changing, deceleration], a strategy of [lane-changing, acceleration], a strategy of [no lane-changing, deceleration], and a strategy of [no lane-changing, acceleration], respectively;

$Q_{11},Q_{12},Q_{21},Q_{22}$ denote payoffs of the aggressive rear vehicle in the target lane under a combination of four strategies with the specified vehicle, which includes a strategy of [lane-changing, deceleration], a strategy of [lane-changing, acceleration], a strategy of [no lane-changing, deceleration], and a strategy of [no lane-changing, acceleration], respectively;

the payoff matrix of the specified vehicle and the non-aggressive rear vehicle in the target lane is: $(U_{33},Q_{33})$, $(U_{34},Q_{34})$, $(U_{43},Q_{43})$, and $(U_{44},Q_{44})$, wherein $U_{33}, U_{34}, U_{43}, U_{44}$ denote payoffs of the specified vehicle under a combination of four strategies with the non-aggressive rear vehicle in the target lane, which includes a strategy of [lane-changing, deceleration], a strategy of [lane-changing, acceleration], a strategy of [no lane-changing, deceleration], and a strategy of [no lane-changing, acceleration], respectively;

$Q_{33},Q_{34},Q_{43}, Q_{44}$ denote payoffs of the non-aggressive rear vehicle in the target lane under a combination of four strategies with the specified vehicle, which includes a strategy of [lane-changing, deceleration], a strategy of [lane-changing, acceleration], a strategy of [no lane-changing, deceleration], and a strategy of [no lane-changing, acceleration], respectively;

the payoff U for the specified vehicle and the payoff Q for the rear vehicle in the target lane include payoffs at a future moment, the payoffs at the future moment including four components:

(1) the safety prediction payoff, denotes as:

Term$(sf)$=-{$\omega_{11}[A_c(t')+v_{SV}(t')*v_{RV}(t')]*I(A_c)+\omega_{12}$
  $[A_s(t')+v_{SV}(t')*v_{RV}(t')]*I(A_s)$} wherein, $v_{SV}(t')$ and $v_{RV}(t')$ denote a driving speed of the specified vehicle and a driving speed of the rear vehicle in the target lane at a predicted moment t', respectively, $A_c(t')$ denotes an overlap area of vehicle collision determination regions at the predicted moment t', $A_s(t')$ denotes an overlap area of vehicle safety reservation regions at the predicted moment t', $\omega_{11}$ and $\omega_{12}$ denote a collision weight and a safety reservation weight, respectively, and $I(A_c)$ and $I(A_s)$ denote indicator functions, $I(A_c)$ takes a value of 1 when the vehicle collision determination regions overlap and takes a value of 0 when the vehicle collision determination regions do not overlap, $I(A_s)$ takes a value of 1 when the vehicle safety reservation regions overlap and takes a value of 0 when the vehicle safety reservation regions do not overlap;

(2) the time prediction payoff, denoted as:

Term(time)=$v(t')$ wherein, $v(t')$ denotes a driving speed of the rear vehicle in the target lane in the game at the predicted moment t';

(3) the comfort prediction payoff:

taking a derivative, denoted as Jerk, of an acceleration of the specified vehicle or an acceleration of the rear vehicle in the target lane at the predicted moment t' during a vehicle driving process as the comfort prediction payoff, denoted as:

Term$(cf)$=-|Jerk$(t')$| wherein, Jerk$(t')$ denotes the derivative of the acceleration of the specified vehicle or the acceleration of the rear vehicle in the target lane at the predicted moment t'; and (4) the cooperation prediction payoff:

taking an acceleration $a_j(t')$ of the rear vehicle in the target lane in the game at the predicted moment t' as a quantitative index of the cooperation prediction payoff, denoted as:

Term$(gt)$=-|$a_j(t')$| wherein the payoff of the specified vehicle and the payoff of the rear vehicle in the target lane are determined by combining and weighting, respectively:

$$U = \sum_{t+1}^{H}(\omega_1 \text{Term}(sf) + \omega_2 \text{Term}(time) + \omega_3 \text{Term}(cf) + \omega_4 \text{Term}(gt))$$

$$Q = \sum_{t+1}^{H}(\sigma_1 \text{Term}(sf) + \sigma_2 \text{Term}(time) + \sigma_3 \text{Term}(cf) + \sigma_4 \text{Term}(gt))$$

wherein, $\omega=[\omega_1, \omega_2, \omega_3, \omega_4]$ and $\sigma=[\sigma_1, \sigma_2, \sigma_3, \sigma_4]$, $\omega$ and $\sigma$ denote weight coefficients, wherein the driver aggressiveness factor $\beta_t$ is used to construct the weight coefficients of the payoff U of the specified vehicle:

$$\omega = \begin{cases} \omega_1 = k_1 * \beta_t \\ \omega_2 = k_2 * (1 - \beta_t) \\ \omega_3 = k_3 * (1 - \beta_t) \\ \omega_4 = k_4 * \beta_t \end{cases}$$

wherein $k=[k_1, k_2, k_3, k_4]$, $k_1$, $k_2$, $k_3$, and $k_4$ denote gain factors for the safety prediction payoff, the time prediction payoff, the comfort prediction payoff, and the cooperation prediction payoff, respectively.

2. The method of claim 1, wherein in the step 1, a count of aggressive drivers n (A) and a count of non-aggressive drivers n(NA) are determined under a set road section and a set time period using a clustering algorithm to solve for the prior probability distribution of vehicle driving style of the side vehicle:

$$\begin{cases} P_0(X|(\text{road, time})) = [p(A), 1 - p(A)] \\ p(A) = \dfrac{n(A)}{n(A) + n(NA)} \end{cases}$$

wherein, road and time denote the set road section and the set time period, respectively, p(A) denotes a probability that the vehicle driving style is aggressive, and 1–p(A) denotes a probability that the vehicle driving style is non-aggressive.

3. The method of claim 1, wherein in the step 2, an original predetermined distance $d_{min}$ and a lane-changing predetermined distance $l_{min}$ are determined, wherein $d_{min}$ is a minimum of all original predetermined distances $[d_1, d_2, \ldots, d_t]$ in the next t moments, $l_{min}$ is a minimum of all lane-changing predetermined distances $[l_1, l_2, \ldots, l_t]$ in the next t moments, and the lane-changing necessity and the lane-changing safety are determined based on the cumulative distribution function constructed by introducing the expectation and the variance:

$$P_{ne} = \frac{1}{\sigma\sqrt{2\pi}} \int e^{-\frac{(d_{min}-u_k)^2}{2\sigma^2}} dd_{min}$$

$$P_{sf} = \frac{1}{\sigma\sqrt{2\pi}} \int e^{-\frac{(l_{min}-u_l)^2}{2\sigma^2}} dl_{min}$$

wherein, $P_{ne}$ and $P_{sf}$ denote the lane-changing necessity and the lane-changing safety, respectively, $u_k$ and $u_l$ denote an expectation of the original predetermined distance and an expectation of the lane-changing predetermined distance, respectively, and $\sigma$ denotes the variance;

in the lane-changing willingness output model, a membership function of each of the lane-changing necessity, the lane-changing safety, and the lane-changing willingness is constructed, and a lane-changing willingness $\varphi_{LC}$ is obtained by performing a defuzzification operation according to a fuzzy rule table and a center of mass technique;

in response to a determination that the lane-changing willingness $\varphi_{LC}$ is greater than the lane-changing willingness threshold $\varphi_{die}$, subsequent lane-changing decision-making process is performed.

4. The method of claim 1, wherein in the step 3,
an accuracy y of the acceleration of the rear vehicle in the target lane is determined based on the on-board sensor, a likelihood function of a driving state of the rear vehicle in the target lane being a non-decelerating state is determined, denoted as $L(\theta|A)=(y, 1-y)$, and a likelihood function of the driving state of the rear vehicle in the target lane being a decelerating state is determined, denoted as $L(\theta|NA)=(1-y, y)$;

the posterior probability distribution $P_t(Y(\text{road},\text{time}))$ of the vehicle driving style of the rear vehicle in the target lane is obtained based on the prior probability distribution of the vehicle driving style and the likelihood function:

$$P_t(Y|(\text{road},\text{time}))=\text{normalize}(P_0(X|(\text{road},\text{time})*L(\theta))$$

a posterior probability distribution at a moment t is designated as a prior probability distribution at a moment t+1;

the driver aggressiveness factor $\beta_t$ of the rear vehicle in the target lane at the moment t is obtained based on the posteriori probability distribution of the vehicle driving style:

$$\beta_t = V_{type} \cdot P_t(Y|(\text{road},\text{time}))$$

wherein $V_{type}$ denotes a unit vector.

5. The method of claim 1, wherein in the step 4,
the driving speed of the specified vehicle, the acceleration of the specified vehicle, the driving speed of the rear vehicle in the target lane, and the acceleration of the rear vehicle in the target lane are obtained through prediction based on the LSTM neural network, a driving trajectory of the specified vehicle and a driving trajectory of a non-lane-changing behavior of the rear vehicle in the target lane in the future-projected time domain are obtained through prediction based on the vehicle kinematic model, and a driving trajectory of a lane-changing behavior of the specified vehicle is obtained based on the longitudinal trajectory deduced from the vehicle kinematic model and a lateral trajectory deduced from a fifth degree polynomial curve.

6. The method of claim 1, wherein
the probability of lane-changing execution of the specified vehicle is determined based on eight cases of the payoff matrix, the eight cases of the payoff matrix including the payoff matrix of the specified vehicle and the aggressive rear vehicle in the target lane, and the payoff matrix of the specified vehicle and the non-aggressive rear vehicle in the target lane, and an expected payoff $E_p$ is denoted as:

$$E_p=P_t(Y|(\text{road},\text{time}))*[P_t(lc)*(U_{11}+U_{12})+(1-P_t(lc))*(U_{21}+U_{22})]+(1-P_t(Y|(\text{road},\text{time})))*[P_t(lc)*(U_{33}+U_{34})+(1-P_t(lc))*(U_{43}+U_{44})]$$

the probability of lane change execution $P_t(lc)$ is determined when the expected payoff $E_p$ is maximized.

7. The method of claim 1, wherein in the step 6,
in response to a determination that the probability of lane-changing execution is less than the execution threshold, the longitudinal trajectory of the specified vehicle is updated, and the longitudinal trajectory is determined based on a full velocity difference (FVD) model:

$$a_j(t)=\rho|V(\Delta(x_j)-v_j(t)|+\lambda\Delta v_j(t)$$

wherein j denotes a vehicle number, $a_j(t)$ denotes an acceleration at a moment t, $v_j(t)$ denotes a driving speed at the moment t, $\Delta v_j(t)$ denotes a speed difference at the moment t, $\rho$ and $\lambda$ denote weight coefficients, and $V(\Delta(x_j))$ denotes an optimized speed function:

$$V(\Delta(x_j)) = \frac{v_{max}}{2}[\tanh(\Delta x_j(t) - h_c) + \tanh(h_c)]$$

wherein, $v_{max}$ denotes a maximum vehicle speed, $h_c$ denotes a safe distance between vehicles, and $\Delta x_j(t)$ denotes an actual distance between vehicles at the moment t.

8. The method of claim 1, wherein in the step 6,
in response to a determination that the probability of lane-changing execution is greater than or equal to the execution threshold, the lane-changing trajectory of the specified vehicle and the longitudinal trajectory of the specified vehicle are updated, simultaneously, the longitudinal trajectory is determined based on a full velocity difference (FVD) model, and a lateral trajectory of the specified vehicle is determined by using a fifth degree polynomial, the fifth degree polynomial being represented as:

$$y(t)=a_0+a_1t+a_2t^2+a_3t^3+a_4t^4+a_5t^5$$

wherein $A=[a_0, a_1, a_2, a_3, a_4, a_5]$ are coefficients of the fifth degree polynomial.

* * * * *